US006335742B1

(12) United States Patent
Takemoto

(10) Patent No.: US 6,335,742 B1
(45) Date of Patent: *Jan. 1, 2002

(54) APPARATUS FOR FILE MANAGEMENT AND MANIPULATION USING GRAPHICAL DISPLAYS AND TEXTUAL DESCRIPTIONS

(75) Inventor: Hiroshi Takemoto, Oyama (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,829

(22) Filed: Jul. 24, 1998

(30) Foreign Application Priority Data

Jul. 24, 1997 (JP) .............................. 9-198739

(51) Int. Cl.$^7$ ................................. G09G 5/00
(52) U.S. Cl. ....................... 345/781; 345/845; 345/783; 386/117
(58) Field of Search ................................ 345/356, 340, 345/345, 343, 355, 781, 732, 783, 803, 806, 797, 796, 791, 802, 848, 850, 851, 852, 849, 836, 782, 751, 706, 853, 855, 854, 841, 818, 819, 820, 809, 845; 386/117, 506

(56) References Cited

U.S. PATENT DOCUMENTS

| | | | | |
|---|---|---|---|---|
| 4,527,155 A | * | 7/1985 | Yamaki et al. ............... | 345/156 |
| 5,060,135 A | | 10/1991 | Levine et al. | |
| 5,425,141 A | * | 6/1995 | Gedye .......................... | 395/155 |
| 5,552,824 A | * | 9/1996 | DeAngelis et al. .......... | 348/157 |
| 5,581,311 A | * | 12/1996 | Kuroiwa ....................... | 348/231 |
| 5,604,771 A | * | 2/1997 | Quiros ......................... | 375/326 |
| 5,717,877 A | * | 2/1998 | Orton et al. ................. | 345/326 |
| 5,740,267 A | * | 4/1998 | Echerer et al. ............. | 382/132 |
| 5,905,988 A | * | 5/1999 | Schwartz et al. ........... | 707/104 |
| 5,929,854 A | * | 7/1999 | Ross ........................... | 345/342 |
| 6,031,529 A | * | 2/2000 | Migos et al. ................ | 345/340 |
| 6,078,324 A | * | 6/2000 | Phathayakorn et al. ..... | 345/348 |
| 6,078,579 A | * | 6/2000 | Weingarten .................. | 370/352 |
| 6,097,389 A | * | 8/2000 | Morris et al. ................ | 345/346 |
| 6,118,480 A | * | 9/2000 | Anderson et al. ........... | 348/207 |
| 6,175,922 B1 | * | 1/2001 | Wang .......................... | 713/182 |

OTHER PUBLICATIONS

Microsoft Media Manager web page at http://www.microsoft.com/japan/developer/mediamanager/.

* cited by examiner

*Primary Examiner*—Raymond J. Bayerl
*Assistant Examiner*—Thomas J Joseph
(74) *Attorney, Agent, or Firm*—Oblon, Spivak, McClelland, Maier & Neustadt, P.C.

(57) ABSTRACT

A processor-based display processing apparatus, method and user interface allows for easy understanding of the contents of respective files by present a portion of the respective files as a graphics image along with other associated attributes of the respective files. A computer readable recording medium with a program recorded therein is provided for enabling a computer to function as the apparatus and perform the method. In the display processing apparatus, when an operator selects a folder from a folder display area on a browser screen, a processor controls the selected folder to be identified and displayed, and graphics images of image files contained in the selected folder are displayed in a predetermined display area.

60 Claims, 22 Drawing Sheets

KEYWORD TABLE 17A

| KEYWORD CHARACTERS | KEYWORD |
|---|---|
| A | PICTURE OF SEA |
| B | PICTURE OF MOUNTAIN |
| C | OVERSEA TRAVEL |
| ⋮ | ⋮ |

*FIG. 2*

IMAGE FILE 17C

| HEADER INFORMATION |
|---|
| IMAGE DATA |
| THUMBNAIL DATA |
| MEMO INFORMATIOM |
| PHOTOGRAPHING INFORMATION |

*FIG. 3*

RETRIEVING TABLE 17B

| FOLDER NAME | FILE NAME | MEMORY ADDRESS | CREATION DATE & TIME | THUMBNAIL | KEYWORD CHARACTER | MEMO INFORMATION | PHOTOGRAPHING INFORMATION | AUDIO FILE |
|---|---|---|---|---|---|---|---|---|
| tmp | dlbE333.bmp | XXXX | 96.5.7.4.10 | 1 | A | 1 | 1 | CCC.WAV |
| tmp | 0035.bmp | YYYY | 96.7.4.5.15 | 1 | A,B | 0 | 0 | DDD.WAV |
| tmp | 0238.JPG | ZZZZ | 96.8.3.5.01 | 1 | C | 1 | 1 | EEE.WAV |
| ----- | ----- | ----- | ----- | ----- | ----- | ----- | ----- | ----- |

| FILE |
|---|
| CREAT NEW FOLDER (F) |
| OPEN REGISTRATION WINDOW (O) |
| CHANGE NAME (M) |
| DELETE (D) |
| PROPERTY (R) |
| REGISTER APPLICATION (A) |
| REGISTER KEYWORD (K) |
| RETRIEVE KEYWORD (S) |
| ACQUIRE FROM SCANNER (I) △ |
| PRINT (P) |
| PRINT PREVIEW (V) |
| PRINTER SETTING (R) |
| PRINTPARAMETER SETTING (S) |
| END (X) |

FIG. 13B

| EDIT |
|---|
| RESTORE (F) |
| COPY (C) |
| PASTE (P) |
| SELECT ALL (S) |

FIG. 13C

| DISPLAY |
|---|
| SORTING (S) |
| DISPLAY SIZE (D) |
| DISPLAY ALL IN FOLDER (A) |
| DISPLAY UPDATED STATE (R) |
| TOOL BAR (T) |
| STATUS BAR (S) |
| ICON BAR (I) |

FIG. 13D

| IMAGE |
|---|
| DISPLAY IMAGE (V) |
| MEMO SETTING (M) |
| AUDIO SETTING (M) |
| DELETE AUDIO (F) |
| KEYWORD SETTING (K) |
| CONVERT IMAGE FORMAT (H) |
| CREATE THUMBNAIL (N) |
| DELETE THUMBNAIL (D) |

| FILE |
|---|
| STORE AFTER OVERWRITING (S) |
| STORE AFTER NAMING (A) |
| PRINT (P) |
| PRINT PREVIEW (V) |
| PRINTER SETTING (R) |
| PRINT PARAMETER SETTING (S) |
| END (X) |

*FIG. 14A*

| CORRECTION |
|---|
| RECOVER ORIGINAL PICTURE (G) |
| BRIGHTNESS/CONTRAST (L) |
| SHARPNESS (S) |
| ROTATION (R) ▷ |

*FIG. 14B*

| DISPLAY |
|---|
| DISPLAY THE WHOLE |
| DISPLAY THE EXACT SIZE |
| ENLARGE ▷ |
| REDUCE ▷ |
| TOOL BAR (T) |
| STATUS BAR (S) |

*FIG. 14C*

APPARATUS FOR FILE MANAGEMENT AND MANIPULATION USING GRAPHICAL DISPLAYS AND TEXTUAL DESCRIPTIONS

BACKGROUND OF THE INVENTION

1. Field of the Invention

The present invention relates to processor-based display methods, apparatuses, computer-program products and graphical user interfaces. In particular, the invention relates to a display processing apparatus having a browsing function and a recording medium with a program recorded therein that when executed by a processor provides a user-friendly file management and file manipulation capability.

2. Discussion of the Background

Recently, file management software and browser software applications have become popular, particularly with the advent of the Internet. One known software application displays a selected folder list in a window while showing a tree structure of folders in another window (e.g., WINDOWS '95 from MICROSOFT).

Such file management software applications or browser software applications are designed to display some file-related information such as file name and its creation date in the folder list. With the current tendency to increase the capacity of recording media, various equipment including computers are required to store increasing large number of files, and hence increasing the burden of retrieval efficiency in order to retrieve a desired file in a timely fashion. In particular, many image files read into a computer from scanners, digital cameras or via video capture boards have unique, but "mechanical" file names (e.g., 0019872txt.tiff) that are not particularly helpful to a user in identifying what the data file's contents.

The present inventor, in light of the inability of conventional apparatus systems and methods to provide a meaningful description of large graphics files, determined that it is desirable to display the contents of such files in a way that eases the burden on the user. More particularly, it is assumed that it is helpful to users to select a desired file based on some advanced knowledge of what is contained in the respective files (which perhaps may only be a mental image), and based on a brief review of a label, or other descriptor of the file itself. It is also desirable to improve the ease of search for the desired file by use of a cross-searching feature that allows users to search for the file across several folders.

However, in conventional file management software applications or browser software systems, because only the information indicative of a file name and its creation date is displayed in the folder list, the contents of the desired file is difficult to understand, particularly when a "mechanical" name is given to the file. While software applications such as WINDOWS '95 provide an icon next to the file name, indicating the application for which the file may be launched, there is no meaningful information regarding the substance of the file provided by the file management software. Moreover, the software places the burden on the user to provide a meaningful, descriptive name to the file.

Also, in conventional file management software applications or browser software applications, a retrieving function does not support cross-searching of image files among plural folders. It is therefore difficult to search image files efficiently in a wide range.

One example of a conventional apparatus and interface method is described in U.S. Pat. No. 5,060,135 in which a data processing system that provides a desk view serves as a graphical user interface. Respective files are displayed as stackable images, where the images themselves, representative of the respective files, are miniature images of the substance of the respective files. The goal of the user interface is to simulate a person's desk, where respective files are presented as "stamps" (i.e., miniature images) of the file contents.

However, a limitation with the above-described apparatus and user interface is that the respective miniature images of the files are not provided with other file directory display features that simplify the organization and attributes of the respective files. Furthermore, the graphics images displayed do not include an indicator, indicative of the presence of additional information, such as file name, appended audio information, memo information, or search information, that may assist the user in cataloguing and retrieving information easily, based on a database search, rather than a visual inspection of the computer screen. Thus, while the convention approach may present files as small images of the file contents, there is no reasonable way to organize, categorize and convey, to the user the related attributes of the file simply by viewing the miniature graphics image.

Another limitation with conventional systems and methods is an absence of a way to effectively cross-reference files based on file content. While, commercial databases are available for organizing data, such databases do not simplify user interfaces for file management applications.

SUMMARY OF THE INVENTION

An object of the present invention is to address the above-described and other problems with conventional systems and methods and provide a display processing apparatus, method, computer-program product and user interface that allows an operator to easily ascertain the contents of respective files and manipulate the files.

This and other objects are achieved with a processor-based apparatus, method, computer program-product and user interface according to the present invention that enables efficient searching of image files containing a wide range of subjects and attributes. To this end, the invention provides a display processing apparatus having a plurality of display areas in a display screen that enables browsing various files such as image files, audio files and document files. The display processing apparatus includes a folder identification display mechanism that identifies and displays a folder selected in a folder display area, and a file information display mechanism that displays, in a related information display area, related information for files included in the selected folder.

When at least one image file is contained in the selected folder, the file information display mechanism displays a thumbnail (i.e., a graphics image of the picture represented by the data in the data file) corresponding to the image file in the related information display area.

Further, when at least one document or audio file is contained in the selected folder, an icon indicative of the wipe of the document or audio file is displayed in the related information display area, which is appended to a icon or thumbnail.

The display processing apparatus according to the invention further includes a thumbnail creation mechanism for creating a thumbnail of a selected image file and storing the created thumbnail in a storage mechanism in association with the selected image fie, and a thumbnail display mechanism that reads out and displays the thumbnail in the related information display area when the thumbnail has already been stored in the storage mechanism at the time of displaying the thumbnail or creates and displays a new thumbnail in the related information display area when the thumbnail has not been stored in the storage mechanism.

The display processing apparatus further includes a keyword input mechanism that enables the inputting of one or plural keywords, a keyword setting mechanism that sets the one or plural keywords corresponding to the one or plural thumbnails respectively, a keyword selection mechanism that selects one or plural ones of the keywords input by the keyword input mechanism, and a retrieval mechanism using the keywords, selected by the keyword selection mechanism, as a retrieval key for retrieving thumbnails with the selected keywords set therefor, such that the selected thumbnails are displayed in a list.

Further, the display processing apparatus may also include a keyword display mechanism that displays the keywords, input by the keyword input mechanism, in a keyword display area.

Still further, the display processing apparatus includes an image rotation mechanism that displays an image corresponding to each thumbnail after being rotated at a specific angle. When selected to do so, perhaps by a digital camera command, the image rotation mechanism displays the image after being rotated at a predetermined angle based on photographing information for the image.

Still further, the display processing apparatus according to the invention includes an application start mechanism for launching another different application after transferring an image file corresponding to a thumbnail to the different application by dragging and dropping the thumbnail to an icon indicative of the different application displayed in an icon display area.

The display processing apparatus further includes a correction mechanism that corrects brightness and contrast of a thumbnail in steps and displays the resulting plural thumbnails in a list.

The invention further provides a recording medium with a program recorded therein for enabling a computer to function as the display processing apparatus and user interface according to the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a diagram of a structural example of keyword table hosted in a computer readable media;

FIG. 3 is a diagram of an example data structure of an image file according to the present invention;

FIG. 4 is a diagram of a structural example of a retrieving table hosted in a computer readable media;

FIGS. 13A–C are various example pull-down menus on a menu bar for the browser screen according to the present invention;

FIGS. 14A–C are example pull-dow menus on a menu bar for the viewer screen according to the present invention;

DETAILED DESCRIPTION OF THE PREFERRED EMBODIMENTS

Referring now to the accompanying drawings, an embodiment of a display processing apparatus, method, computer-program product, and user interface will be described that allows a user to conveniently recognize, manage and manipulate a number of data files stored in a processor-based system. The description is presented in order, under the following headings:

1. Structure of Display Processing Apparatus According to Present Embodiment;
2. Browser Program Scheme According to Present Embodiment;
3. Add-In Software;
4. Basic Screen of Browser Program; and
5. Operation of Display Processing Apparatus.

1. Structure of Display Processing Apparatus According to Present Embodiment

Figure 1:
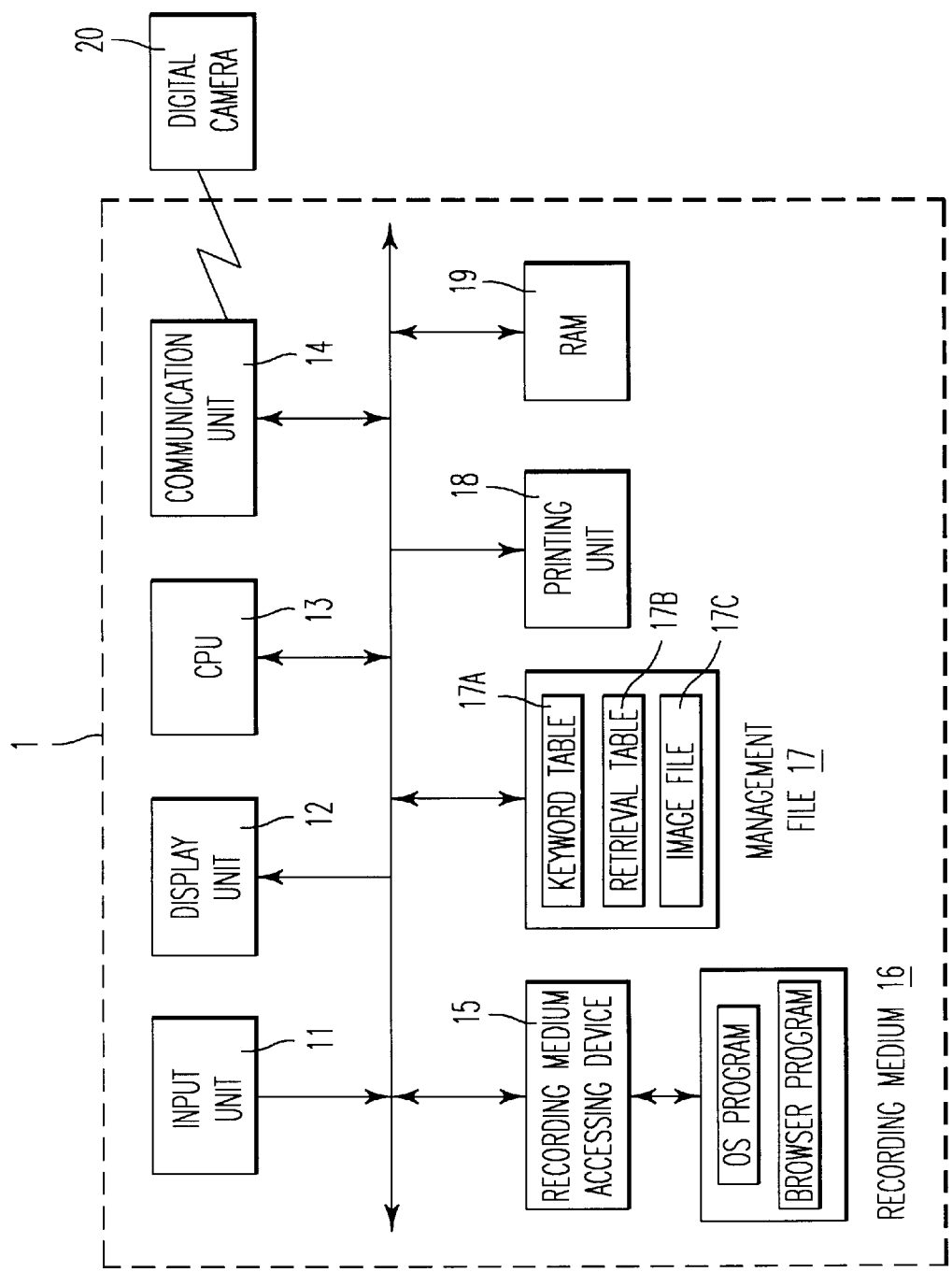
FIG. 1 is a block diagram showing a schematic structure of a display processing apparatus according to an embodiment of the present invention.

FIG. 1 is a block diagram of a display processing apparatus 1 according to the present embodiment. The display processing apparatus 1 includes an input unit 11 that permits an operator to input operation commands, a display unit 12, a CPU 13 for controlling the entire display processing apparatus 1, a communication unit 14 for supporting data communications with external units, a recording medium accessing device 15 for reading/writing data from and to a recording medium 16, the recording medium 16 in which a program for operating the CPU 13 and the like have been stored, a management file 17 for storing image files and the like, a printing unit 18 for printing displayed data and the like, and a RAM 19 used as a work area of the CPU 13 each of these units communicate via a bus, wire harness or the like.

The input unit 11 is constituted as a keyboard with keys thereon, such as cursor keys, numeric input keys and various function keys, a mouse, a scanner for reading images, and the like. However, the input unit 11 need not be a locally connected device, but rather can be a remote device such as a personal communication service telephone (PCS), remote terminal (such as a personal digital assistant) or other device that enables bidirectional signals to be exchanged with the display processing apparatus 1. Moreover, the input unit 11 is a physical-user interface that permits the operator to give operation commands to the CPU 13 and to receive information feedback from the CPU 13, or other system component, such as the respective files held in the RAM 19. A touchpanel and voice recognition mechanism may be used as well.

The display unit 12 is a cathode ray tube (CRT), although a solid state display, such as a liquid crystal display (LCD), plasma display or the like may be used as well, which presents a display in accordance with display data input from the CPU 13. The CPU 13 may be a 32-bit microprocessor, or other microprocessor, digital signal processor (DSP), discrete logic or programmable logic, or the like. Furthermore, the CPU 13 need not be a single processor, but may be a distributed processing resource.

The CPU 13 serves as a control unit for controlling the entire apparatus in accordance with the program stored in the recording medium 16 (e.g., an electrically erasable programmable ROM, or other computer readable medium that is preferably non-volatile). The CPU 13 is connected by the bus to the input unit 11, the display unit 12, the communication unit 14, the recording medium accessing device 15, the management file 17, the printing unit 18 and the RAM 19. By way of the bus connection, the CPU 13 controls data communication operations, application program read operations by accessing the recordings medium 16, read and/or write operations of various data, data/command input, color display, and the like.

The communication unit 14 is connected to a telephone line, an integrated services digital network (ISDN) line, local area network (LAN), wide area network (WAN), wireless network, or the like, to provide data communications through the telephone line via an internal modem, although these physical interfaces are not expressly shown in FIG. 1. The communication unit 14 can also be provided with an RS232C interface or an IrDA interface for cable (wired) data communications through the RS232C interface or infrared-ray (or other wireless) data communications through the IrDA interface with an external apparatus, such as, for example, a digital camera, as shown. Other interfaces may be used as well to support communications with other devices—these interfaces include universal serial bus (USB), EIA-232, ISDN (ISO 8877), and IEEE 1394 ("FireWire") as described in Wickelgren, I., "The Facts About "FireWire"", IEEE Spectrum, April 1997. Vol. 34, Number 4, pp. 19–25, the contents of which is incorporated herein by reference The recording medium 16 has encoded therein various programs and associated data such as an operating system (OS, like WINDOWS) and application programs that can be executed by the CPU 13. An example of such application programs are a browser program including a basic application and an add-in software application. The recording medium may be an optical, magnetical or electrical (semiconductor, quantum, etc.) medium, or a combination of thereof. Other media include a floppy disk, a hard disk, a CD-ROM, a DVD-ROM, a magnetical optical disk or a printed circuit card with various semiconductor memory housed thereon. The various programs are stored in the recording medium 16 in the form of object code or source code that can be interpreted directly or indirectly by the CPU 13. The various programs can be pre-stored in the recording medium or downloaded through a communication line.

The RAM 19 includes a work memory portion for storing program specified input commands, input data, processing results and the like, and a display memory portion for temporarily storing display data to be displayed on the display screen of the display unit 12. The management file 17 contains stored therein a keyword table 17a, a retrieving table 17b, plural image files 17c, audio files and document files, and the like.

FIG. 2 is a structural example of how entries in the keyword table 17a are encoded in an associative relationship. As shown in FIG. 2, the keyword table 17a stores keywords input by the operator in association with specific keyword characters (A, B, . . . ). While particular characters are shown in FIG. 2, the keywords may be descriptive words or phrases as well. The keyword table 17a updates data each time a keyword is input or deleted. The purpose is to assign a logical identifier (keyword character) to particular keyword so that files associated with specific keywords may be grouped and sorted based on the assigned keywords and keyword characters, and, due to their relatively small size, the keyword characters may be conveniently displayed with the respective images.

FIG. 3 is an example data structure of au image file 17c. The image file 17c includes header information image data thumbnail data, memo information, and photographing information. The header information includes various data such as image data format, and creation date and time. The thumbnail data is present when a thumbnail of the image file has been created. The memo information contains data set by the operator that is descriptive of the thumbnail (image file). The photographing information including an angle of the photographed image in the case the image has been produced by a digital camera 20, digital video cassette recorder, or the like.

In the image file, as shown in FIG. 3, the image data and the thumbnail data are handled as the same file, but the thumbnail data may be handled as a file separate from the image data and stored in another recording area. In such a case, the memory address or pointer of the thumbnail data has only to be memorized in the image file or the retrieving table.

FIG. 4 is an example of how the retrieving table 17b is encoded with digital information. As shown in FIG. 4, the retrieving table 17b stores data corresponding to each individual file. This data includes folder names, file names contained in the respective folders, memory addresses of the respective files, creation dates and time of the respective files, the existence of a thumbnail of each image file (where "1" indicates the existence of a thumbnail and "0" indicates nonexistence of a thumbnail), keyword characters (A, B, . . . ) assigned to each thumbnail (image file), the existence of memo information set for each thumbnail (image file, where "1" indicates the existence and "0" indicates nonexistence), the existence of photograph/video information (where "1" indicates the existence and "0" indicates nonexistence), and audio file names set for the respective thumbnails (image files, where "0" indicates nonexistence of a corresponding audio file). For example, when a thumbnail is to be displayed, a determination is made by referring to the retrieving table 17b as to whether or not the thumbnail has already been created. If the thumbnail is already created, the corresponding thumbnail is read out from the image file 17c. Also, in the retrieval processing to be described later, a keyword, as a selection object, is retrieved from the retrieving table 17b and a thumbnail corresponding to the keyword is read out from the image file. The retrieving table 17b updates its contents each time data is input, set or deleted. On the other hand, if the thumbnail is not present, the CPU 13 (FIG. 1) performs a thumbnail creation procedure using image data (FIG. 2) to create and display the thumbnail.

2. Browser Program Scheme According to Present Embodiment

Figure 5:
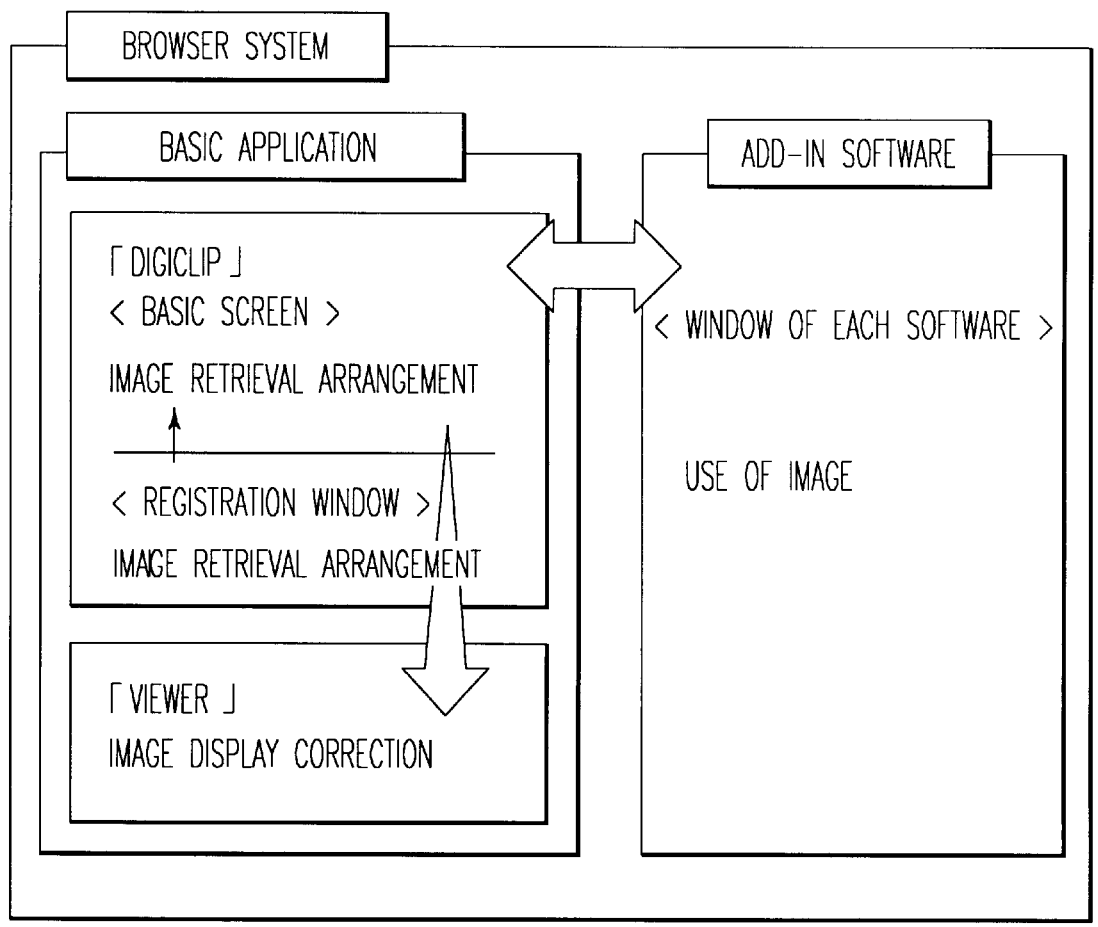
FIG. 5 is a diagram showing a system scheme of a browser application according to the present invention.

FIG. 5 illustrates a system scheme of functional elements explaining how a browser application, stored in the recording medium 16, shares data between the basic application and the add-in software.

The browser system runs on an OS (e.g., WINDOWS NT) having multi-tasking capability and is configured to arrange, retrieve, manipulate and correct visual data on a personal computer (e.g., Dell Omniplex G+) for files, such as image files. The basic application has a main part (referred to as "DIGICLIP") for retrieving and arranging images while displaying thumbnails of image files on the personal computer for each individual folder, and a part (referred to as a "viewer") for correcting, printing and saving a selected image. The add-in software is software that manipulates the images retrieved and arranged by the basic application. Data is exchanged between DIGICLIP and the add-in software, as shown in FIG. 5.

Figure 6:
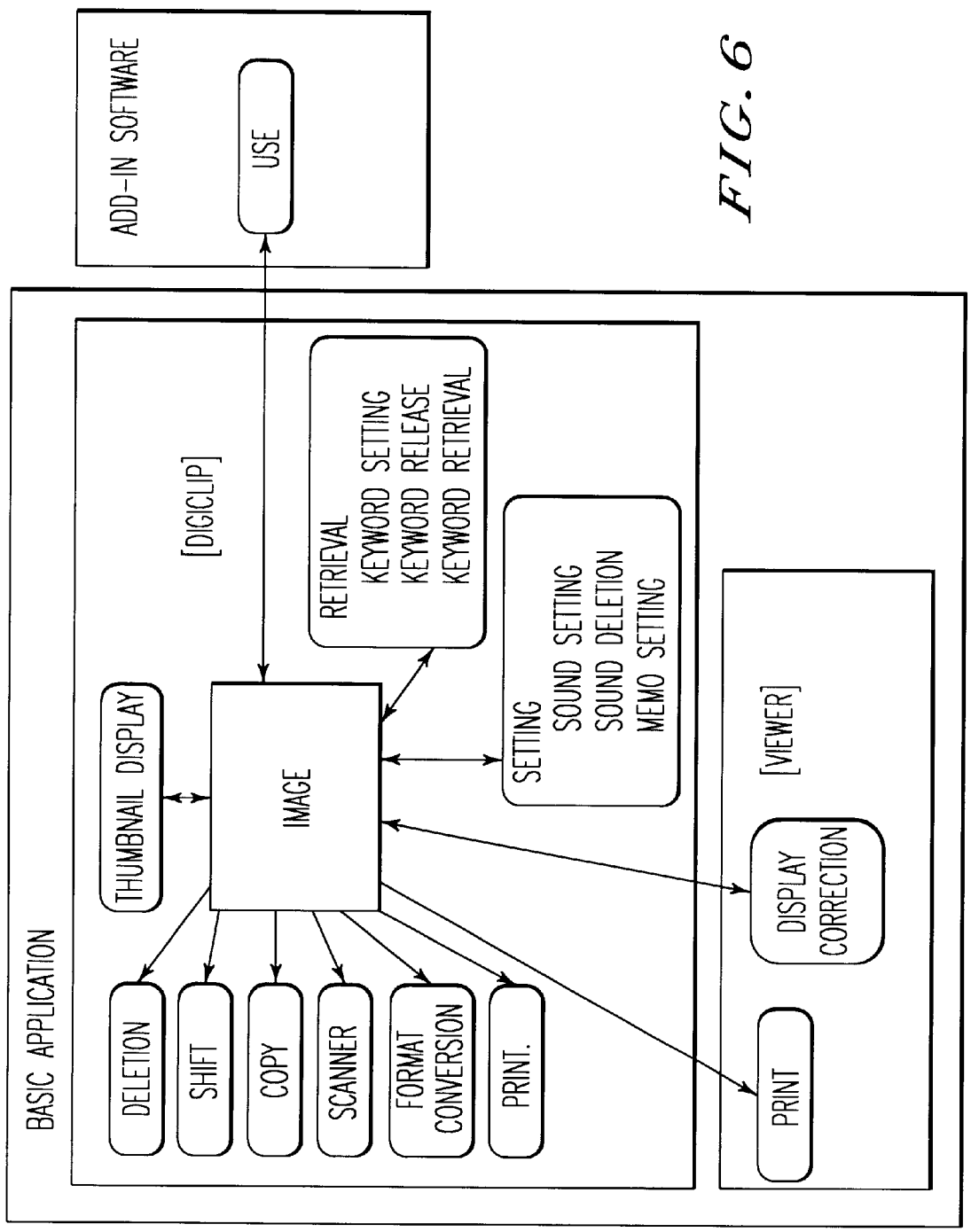
FIG. 6 is a diagram showing user-selectable functions available from the browser application.

FIG. 6 shows user-selectable functional elements of the browser system. These elements serve to manipulate image files, such as display and retrieve thumbnails, setting of sound, memo, copy, shift, deletion, correction and print functions. The fractions provided by the system are described in detail below.

(1) Thumbnail display: this function serves to display thumbnails of all image files in a specified folder.

(2) Retrieval: this function serves to set a keyword or release a keyword from a selected image file (thumbnail). Keyword retrieval is enabled by selecting the keyword previously set.

(3) Setting: this function allows a user to set sound and/or memo data to be associated or disassociated from the selected image file (thumbnail).

(4) Manipulation
deletion: this function enables any user-selected image in the folder to be deleted;
shift: this function allows an image to be moved;
copy: this function allows an image to be copied;
scanner: this function allows a new image to be scanned into the basic application;
format conversion: this function changes a file format from one configuration to another; and
print: this function allows an image file to be printed on a printer (e.g., the printing unit 18, FIG. 1).

(5) Viewer: this function allows a user to view the image selected.

3. Add-In Software

Figure 8:
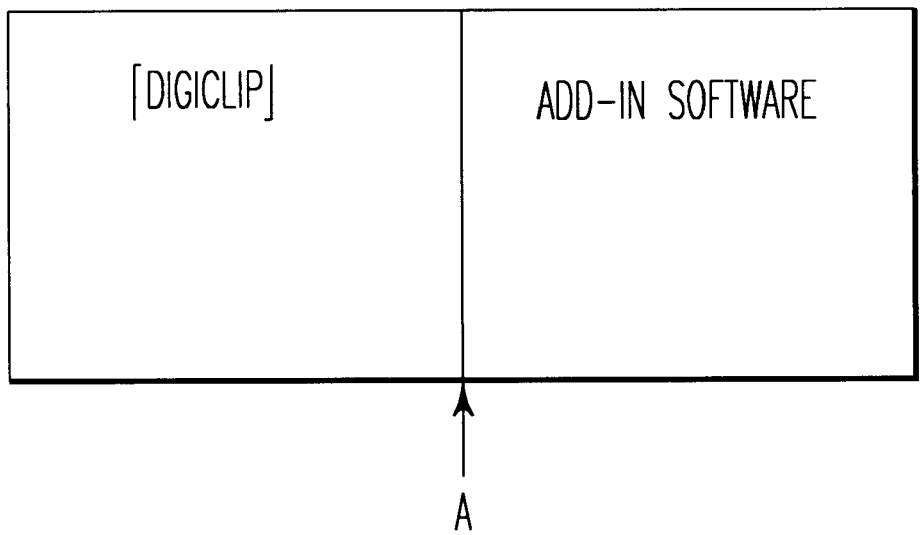
FIG. 8 is a diagram showing a positional correlation between the basic software application software and the add-in software application.
Figure 9:
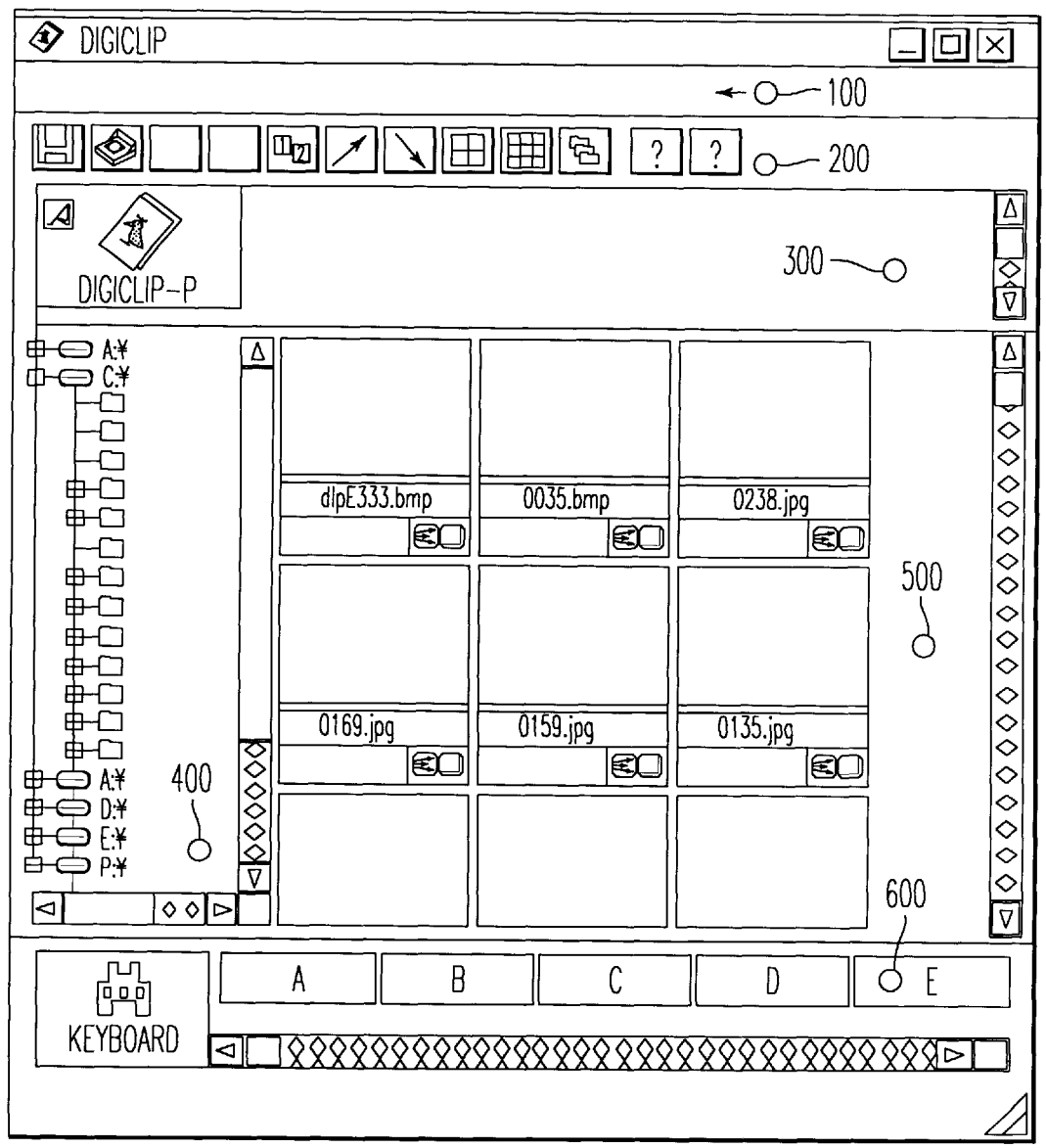
FIG. 9 is an example of a basic browser screen according to the present invention.
Figure 10:
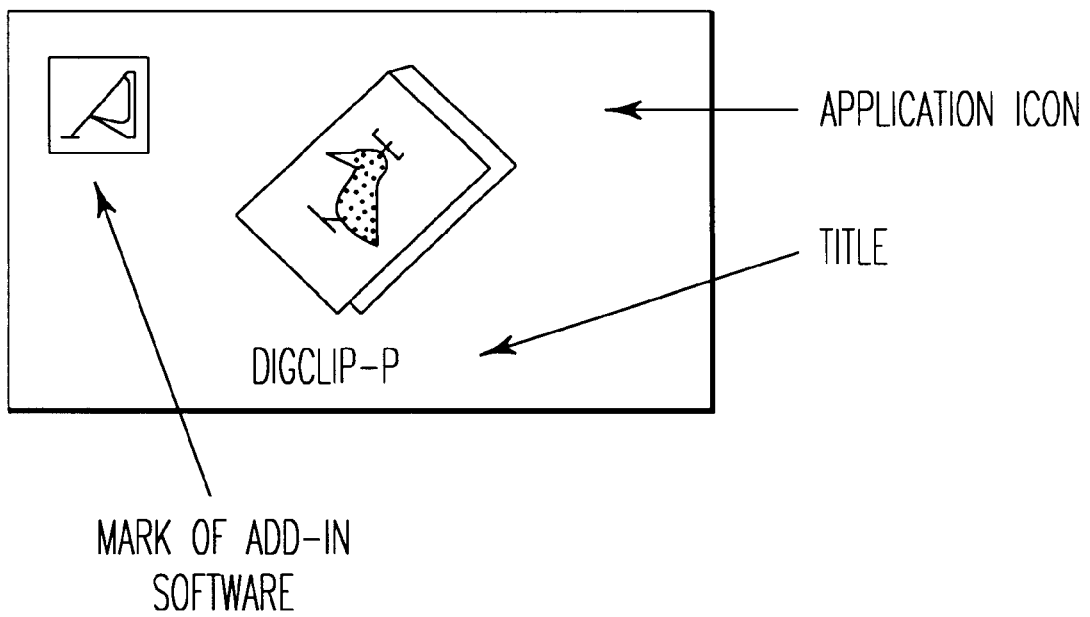
FIG. 10 is an example display with an icon bar.

Once the basic application is started, the icon and title of the add-in software are automatically rendered on an icon bar (see FIGS. 9 and 10). Regarding the relationship between the basic application and the add-in software, the basic application provides an interface (I/F) that permits the add-in software to obtain management information for image files (memo, keyword, sound and thumbnail image) from the basic application. The basic application also provides an interface that permits the add-in software to control the display of the basic application including correlation of windows (as will be discussed with respect to FIG. 8). The add-in software used here makes use of data in accordance with the I/F rules provided by the basic application.

Although the add-in software is an independent application capable of operating alone, when the basic application is launched, the I/F provided by the basic application and drag-drop operation enable the functions of window control and image data deliver, as discussed below.

(1) Control of windows

FIG. 8 shows a positional correlation between a window for the basic application (left window) and a window for the add-in software (right window). The right and left windows vary in size by positioning the cursor (by moving the mouse or other pointing device) on a boundary A between the windows, depressing the left mouse button and moving the mouse horizontally in the desired direction.

(2) Delivery of image data

Figure 7:
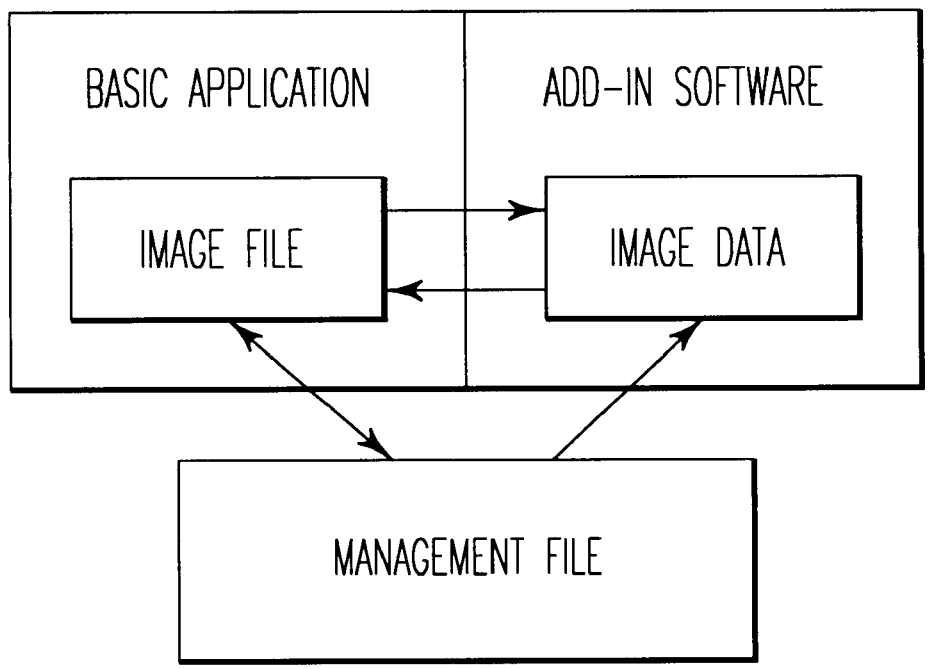
FIG. 7 is a diagram illustrating data exchange between a basic software application and an add-in software application.

FIG. 7 is a diagram for explaining the delivery of data between the basic application and the add-in software. As shown, an image and its file name can be passed from the basic application to the add-in software through the drag-and-drop operation. Further, image data of a DIB (Device Independent Bitmap) format can also be passed from the add-in software to the basic application through the drag-and-drop operation, and registered as a file in the folder of the basic application into which the image data has been dropped. The add-in software can obtain management information for the image file (memo, keyword, sound and thumbnail image) based on the file name received. The management file 17 described above contains system information, such as thumbnail information, audio setting information and memo setting information available to both the basic application and the add-in software application.

4. Basic Screen of Browser Program

FIG. 9 is an example of a basic screen of the basic application, which in the present illustrative embodiment is a browser application. The basic screen includes a menu bar 100 for displaying a menu, a tool bar 200 for displaying tool buttons, an icon bar 300, a folder display area 400, a thumbnail display area 500 (file related information display area) and a keyword bar 600 (keyword display area).

As shown in FIGS. 9 and 10, the icon and title of the application registered are displayed on the icon bar 300. In FIG. 9, the "DIGICLIP-P" icon is displayed on the icon bar 300. The application is launched by selecting (e.g., by double clicking with a pointing device such as a mouse), the icon to be started. Thereafter a thumbnail is selected, the add-in software is started by dragging and dropping the thumbnail on the icon to be started. Folders are displayed in the folder display area 400. After selecting a folder, the folder can be shifted through the drag-and-drop operation or copied by dragging and dropping the folder while pressing the Ctrl key.

Figure 11:
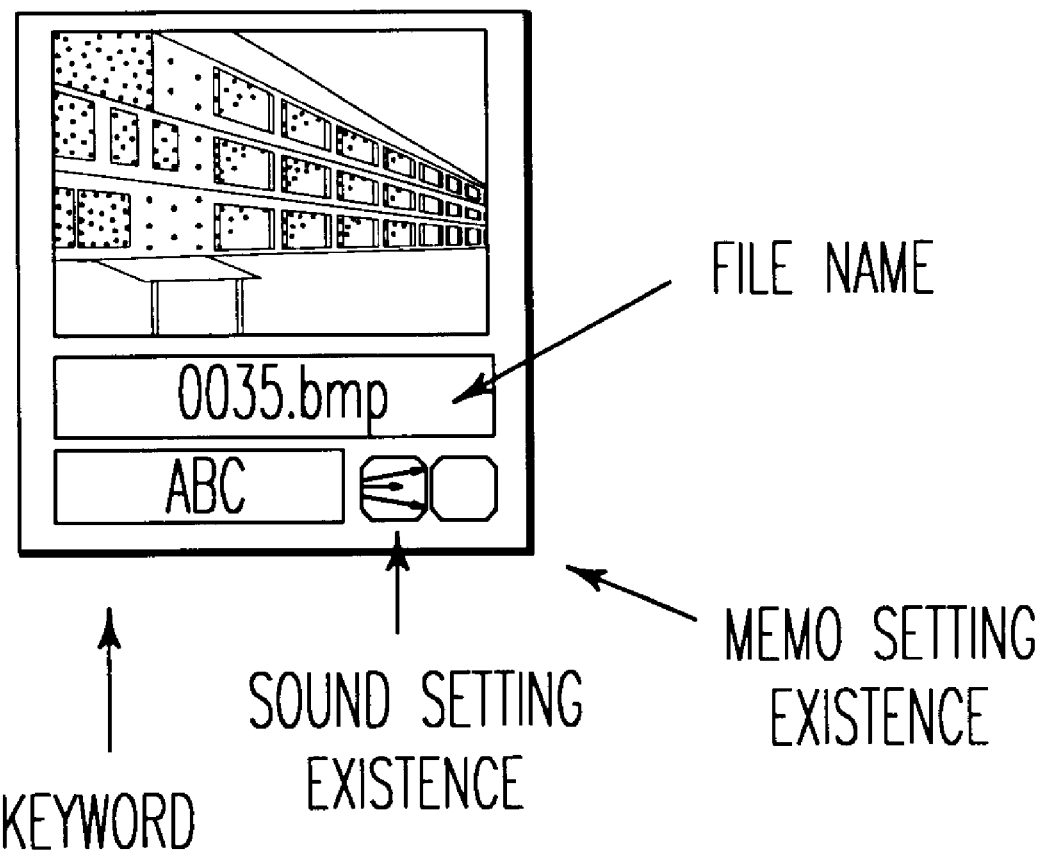
FIG. 11 is an example display of a thumbnail display area.

Thumbnails of image files in the folder selected are displayed in the thumbnail display area 500, each of which including information for the corresponding image file, such as the file name, the keyword, the existence of sound setting and the existence of memo setting, as shown in FIG. 11. By simultaneously displaying this information, the user instantly can recognize the contents of the file and the attributes associated with the file.

Figure 12:
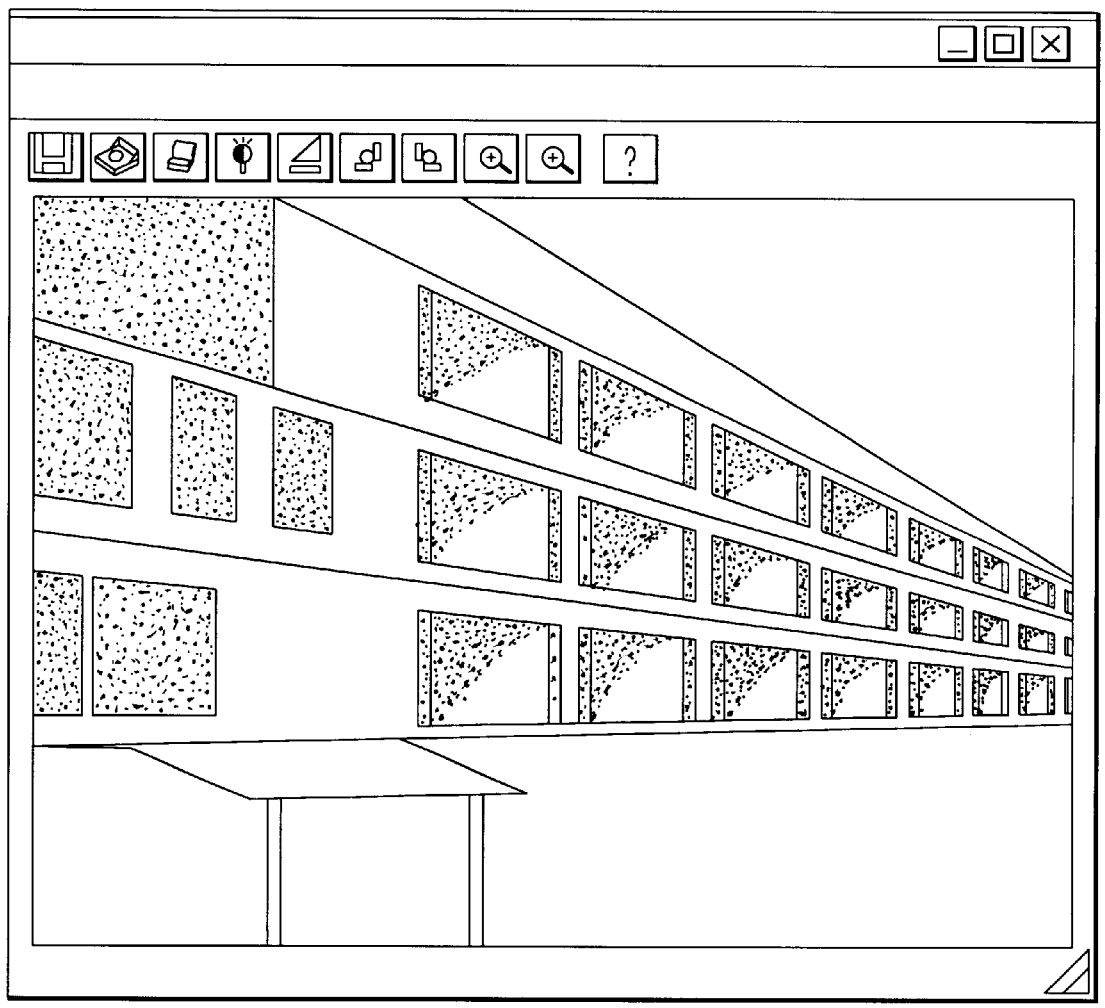
FIG. 12 is an example display as viewed on a viewer screen.

When the thumbnail is selected (e.g., perhaps by pointing to tie thumbnail and double clicking), the "viewer" is activated and a viewer screen such as the one shown in FIG. 12 is displayed, thereby displaying and correcting the image for any rotation that may have occurred when the image was taken with a digital camera or a digital video tape recorder. A plurality of "viewers" can be active at the same time.

Various attributes of the image may be modified or launched when the thumbnail is presented as shown in FIG. 11. For example, the file name can be changed by pointing to the file name, double clicking on the file name, and entering a new file name. Similarly, a keyword can be set by double clicking on the keyword and modifying the keyword field. Sound set for the image file can be played by double clicking the sound symbol. Further, after the thumbnail is selected, the image can be moved to a destination folder by dragging and dropping the thumbnail while pressing the Shift key. Furthermore, after the thumbnail is selected, the image can be copied in a copying destination folder by dragging and dropping the thumbnail.

A plurality of keyword buttons are displayed on tie keyword bar 600, as shown in FIG. 9. After an image file is selected, a keyword is set for the corresponding image by dragging and dropping the image file to a desired keyword button field. Also, a button on the keyword bar can be clicked to display only the images for which the same keyword as on the button clicked is set (keyword retrieval). After the selected keyword button is released, the retrieving operation is completed by clicking a "Keyword" box and all the thumbnails in the folder are displayed.

FIGS. 13A–D illustrate pull-down menus hidden behind the menu bar on the browser screen, and FIGS. 14A–C show pull-down menus hidden behind the menu bar on the viewer screen. Selection of these pull-down menus also permits operation of the browser.

5. Operation of Display Processing Apparatus

Various processes executed by the CPU of the display processing apparatus 1 are performed in accordance with the browser program are described below.

5.1 Identification display

Figure 15:
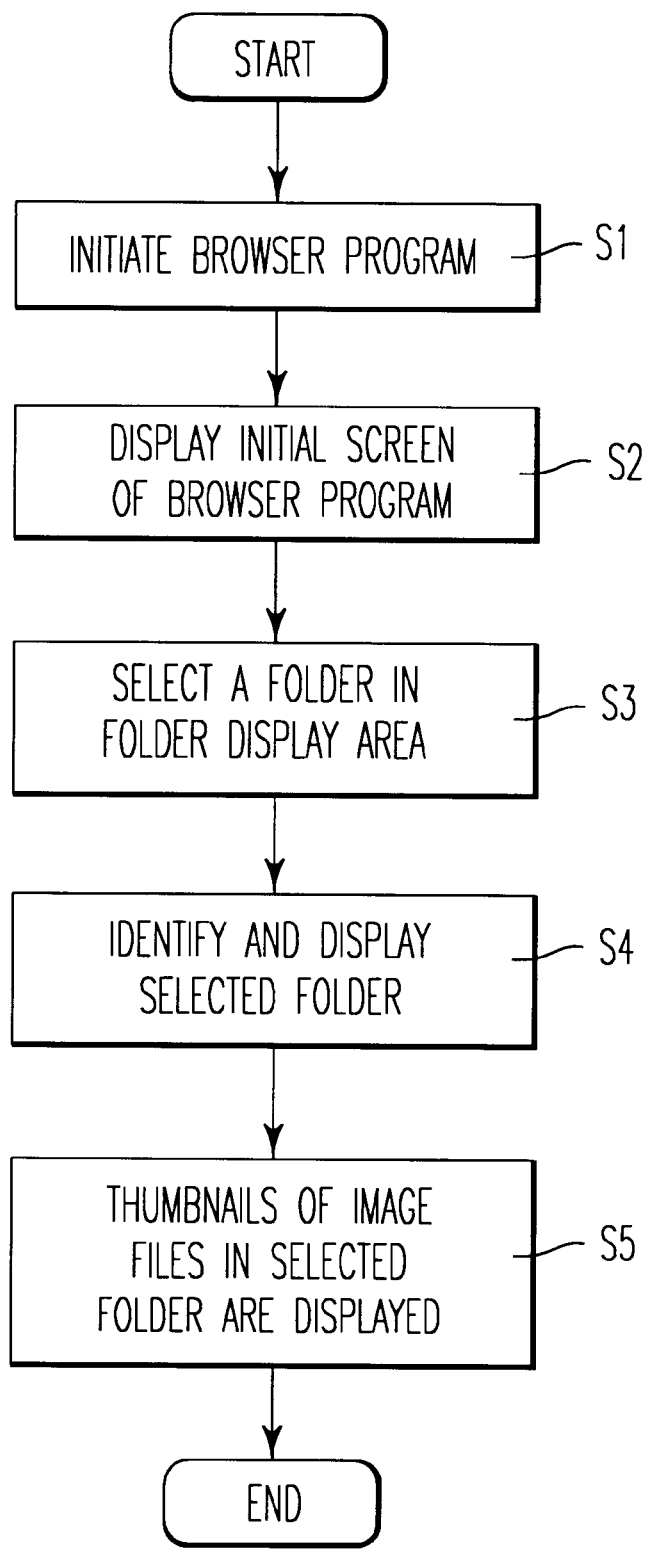
FIG. 15 is a flowchart explaining identification display processing steps executed under control of a CPU.

FIG. 15 is a flowchart for explaining the identification display process executed under control of the CPU 13. When power to the main body of the display processing apparatus 1 is turned on, the browser program stored in the recording medium is initiated (step S1) and an initial screen of the browser program is displayed (step S2). The operator selects a folder in the folder display area 400 (step S3) to identify and display the selected folder (step S4). Then, thumbnails of image files contained in the selected folder are displayed in the thumbnail display area 500 (step S5). In this case, when the thumbnails have already been created and stored in the management file 17, the thumbnails stored can be read out to achieve a high-speed display. If no thumbnail has yet been created, new thumbnails are created and displayed.

Returning to FIG. 9, an example display of this identification display process is shown. In FIG. 9, a folder "tmp" is selected in the folder display area 400. The identification display processing is performed by displaying the folder as if it were open. Further, thumbnails corresponding to image files contained in the folder "tmp" are displayed in the thumbnail display area 500.

Although the above identification display process was described for the case where only the image files are contained in the folder, if audio or document files are also contained in the folder, icons indicative of the type of audio or document file may be displayed in the thumbnail display area (5). Furthermore other operating system paradigms (other than folders) that use hierarchical or relational organizational structures may be used in place of the "folder" approach presented herein.

5.2 Image registration

Image registration processing, executed under control of the CPU is next described by way of three methods including opening a registration window for image registration, registering an image on the clipboard and reading an image from the scanner in the input unit 11 (FIG. 1).

When an image is registered, a folder into which the image is read is first created. Specifically, the operator selects a location where the folder is to be created in the folder display area 400, and then selects "CREATE NEW FOLDER" from the pull-down "FILE" menu on the menu bar 100 (see FIG. 13(A)). After that, the operator inputs a folder name and clicks the "OK" button so that the new folder with the folder name input by the operator will be created and displayed in the folder display area 400. The image is next registered in the registered folder.

Figure 16:
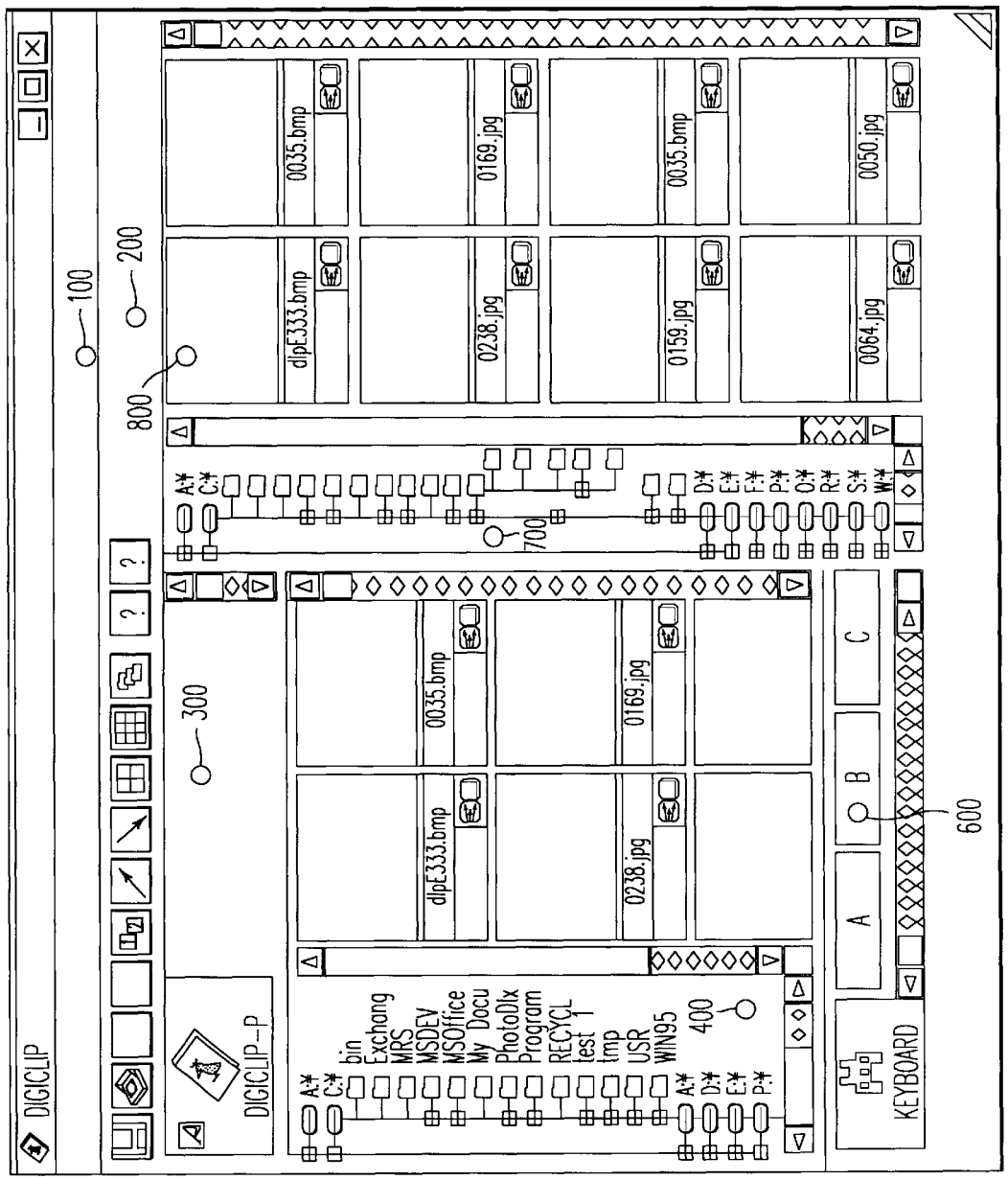
FIG. 16 is an example display screen in a registration window according to the present invention.

From among the above three registration methods, the method to open the registration window for image registration is first described. In this method, when the operator selects "OPEN REGISTRATION WINDOW" from the pull-down "FILE" menu on the menu bar 100 (see FIG. 13(A)) in the browser screen, a registration window such as the one shown in FIG. 16 is displayed. The operator then selects a thumbnail in a thumbnail display area 800 for registered images, drags and drops the thumbnail to a desired folder in a registration folder display area 700, and clicks the "OK" button for confirmation. Thus the image file corresponding to the selected thumbnail is registered in the folder.

Next, the method to register an image on the clipboard is described. The image file is previously copied on the clipboard. When the operator selects "PASTE" from the pull-down "EDIT" menu on the menu bar 100 (see FIG., 13(B)) and then clicks the "OK" button for confirmation, the image file on the clipboard is registered in the folder.

Next, the method to read an image from the scanner in the input unit 11 is described. The operator first selects "ACQUIRE FROM SCANNER" from the pull-down "FILE" menu on the menu bar 100 (see FIG. 13(A)) and places an original picture on the scanner. Then the operator selects a desired folder in the folder display area 400 and selects "SCANNER INPUT" from the pull-down "ACQUIRE FROM SCANNER" menu. Thus the image input from the scanner is registered in the folder. Alternatively, the image may be registered as being acquired from a digital camera or digital video recorder in a similar manner.

5.3 Creation of thumbnail

Figure 17:
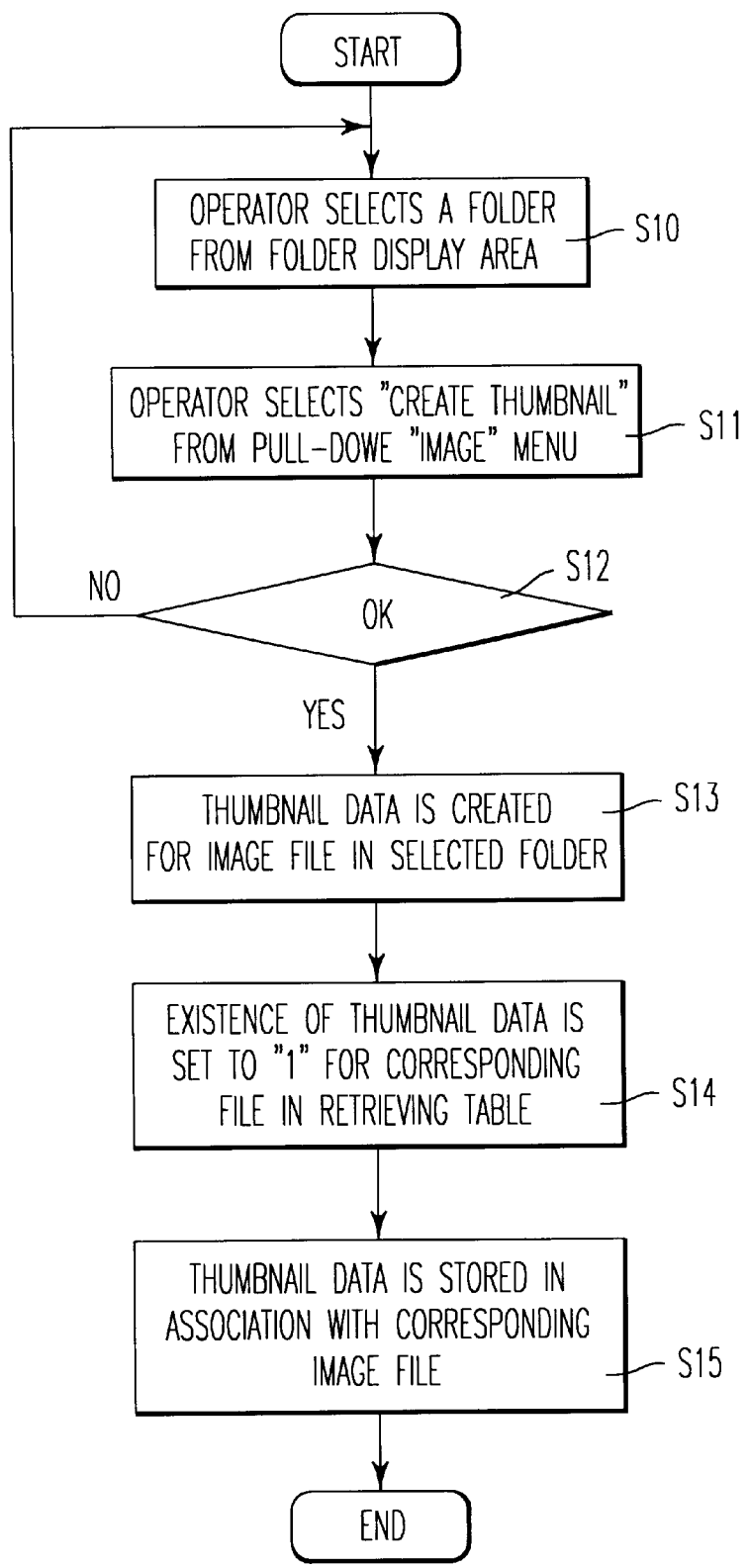
FIG. 17 is a flowchart explaining thumbnail creation processing steps executed under control of a CPU.

FIG. 17 is a flowchart for explaining the thumbnail creation processing steps executed under control of the CPU 13. The process begins when the operator selects a folder from the folder display area 400 (step S10) for creation of a thumbnail. After that, when the operator selects "CREATE THUMBNAIL" from the pull-down "IMAGE" menu on the menu bar 100 (step S11) and clicks the "OK" button (step S12), a thumbnail data is created for an image file in the selected folder (step S13). Then, the retrieving table 17b is updated such that the item "existence of thumbnail data" is set to "1" for the corresponding image file (step S14) and the thumbnail data created is stored in association with the corresponding image file 17c (step S15). If "SELECT ALL IN FOLDER" is selected, thumbnails are created for all the image data in the selected folder. The folder with the created thumbnails therein is displayed with a bold face.

5.4 Deletion of thumbnail

Next a thumbnail deletion processing executed under control of the CPU 13 is described. When the operator selects a folder from the folder display area 400 on the browser screen for deletion of a thumbnail (see FIG. 13(D)), the user selects "DELETE THUMBNAIL" from the pull-down "IMAGE" menu on the menu bar 100 and clicks the "OK" button, so that the thumbnail data created in the folder is deleted. If "SELECT ALL IN FOLDER" is selected, thumbnails for all the image data are deleted from the selected folder.

5.5 Keyword registration

Figure 18:
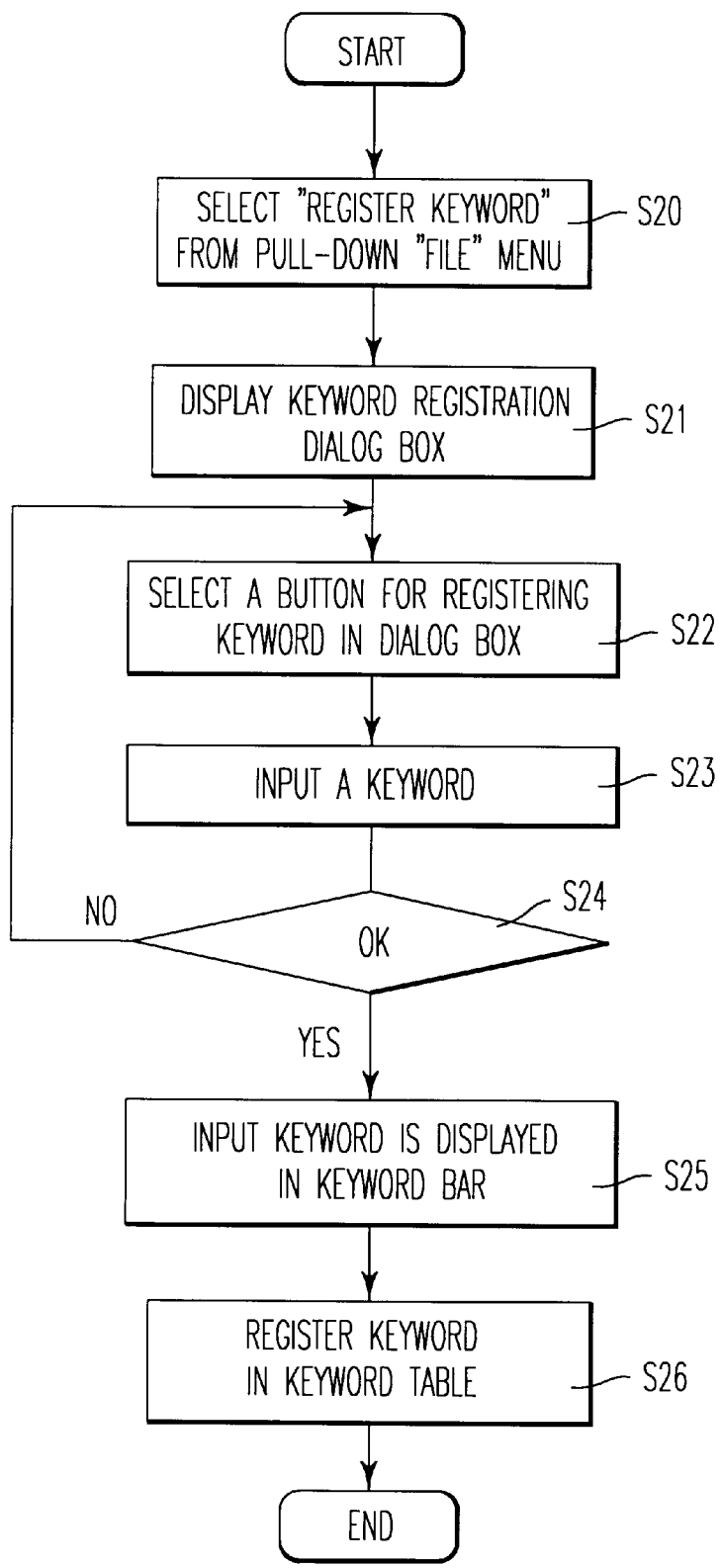
FIG. 18 is a flowchart explaining keyword registration processing steps executed under control of a CPU.
Figure 19:
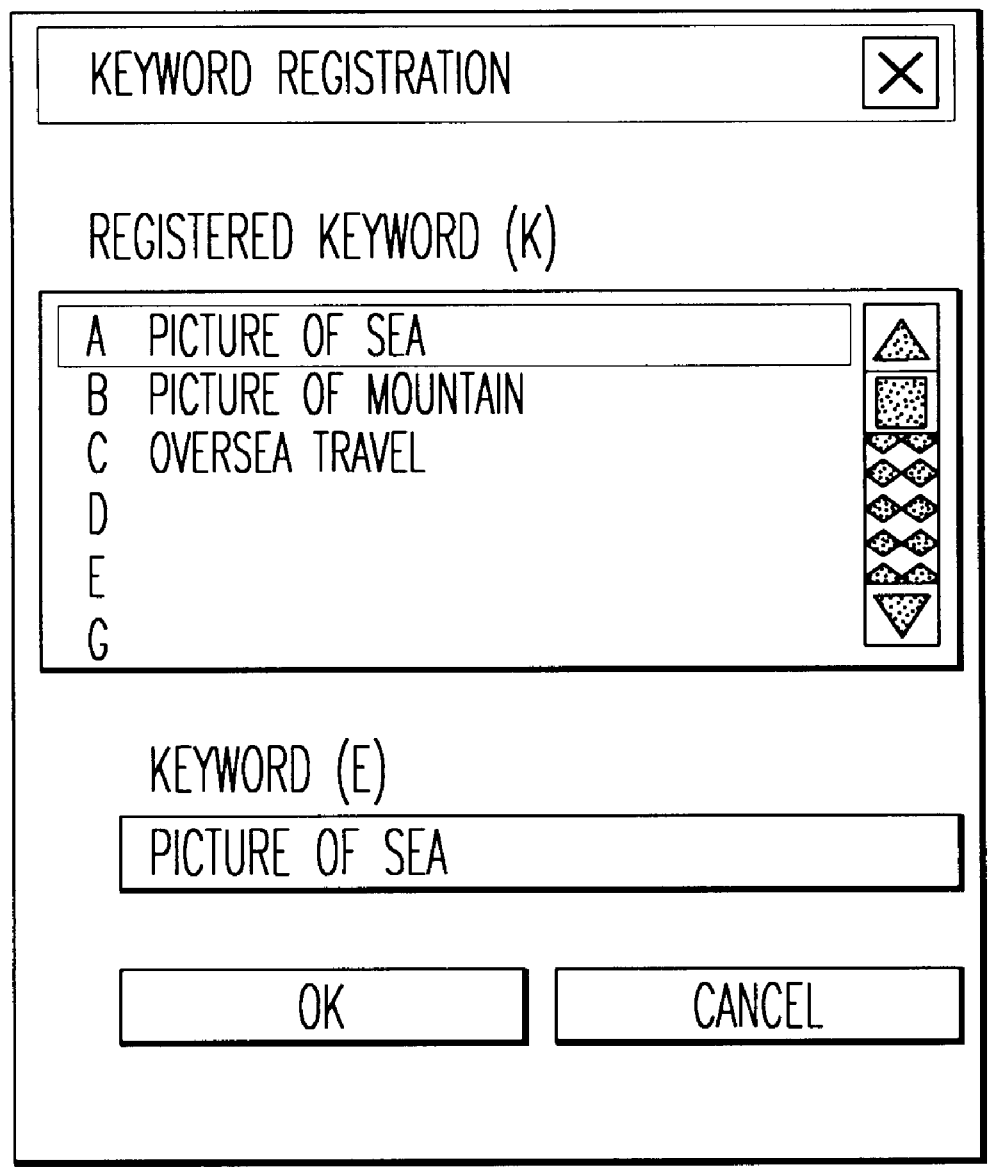
FIG. 19 is a keyword registration dialog box according to the present invention.

Referring next to the flowchart of FIG. 18, and the keyword registration dialog box of FIG. 19, the keyword registration process executed under control of the CPU 13 is describe. The process begins when the operator selects "REGISTER KEYWORD" from the pull-down "FILE" menu on the menu bar 100 in the browser screen (step S20), a keyword registration dialog box such as one shown in FIG. 19 is displayed (step S21). Then, the operator selects a button for registering a keyword in the dialog box (step S22) and inputs a keyword (step S23). If the input keyword is acceptable, the "OK" button is clicked for confirmation (step S24). The input keyword is thus displayed on the keyword bar 600 (step S25) and registered in the keyword table 17a (see FIG. 2) (step S26). In the case shown in FIG. 9, the keywords "picture of sea", "picture of mountain" and "overseas travel" are input and displayed on the keyword bar 600. The input keywords are also stored in the keyword table 17a as shown in FIG. 2.

5.6 Registration of keyword to thumbnail

Figure 20:
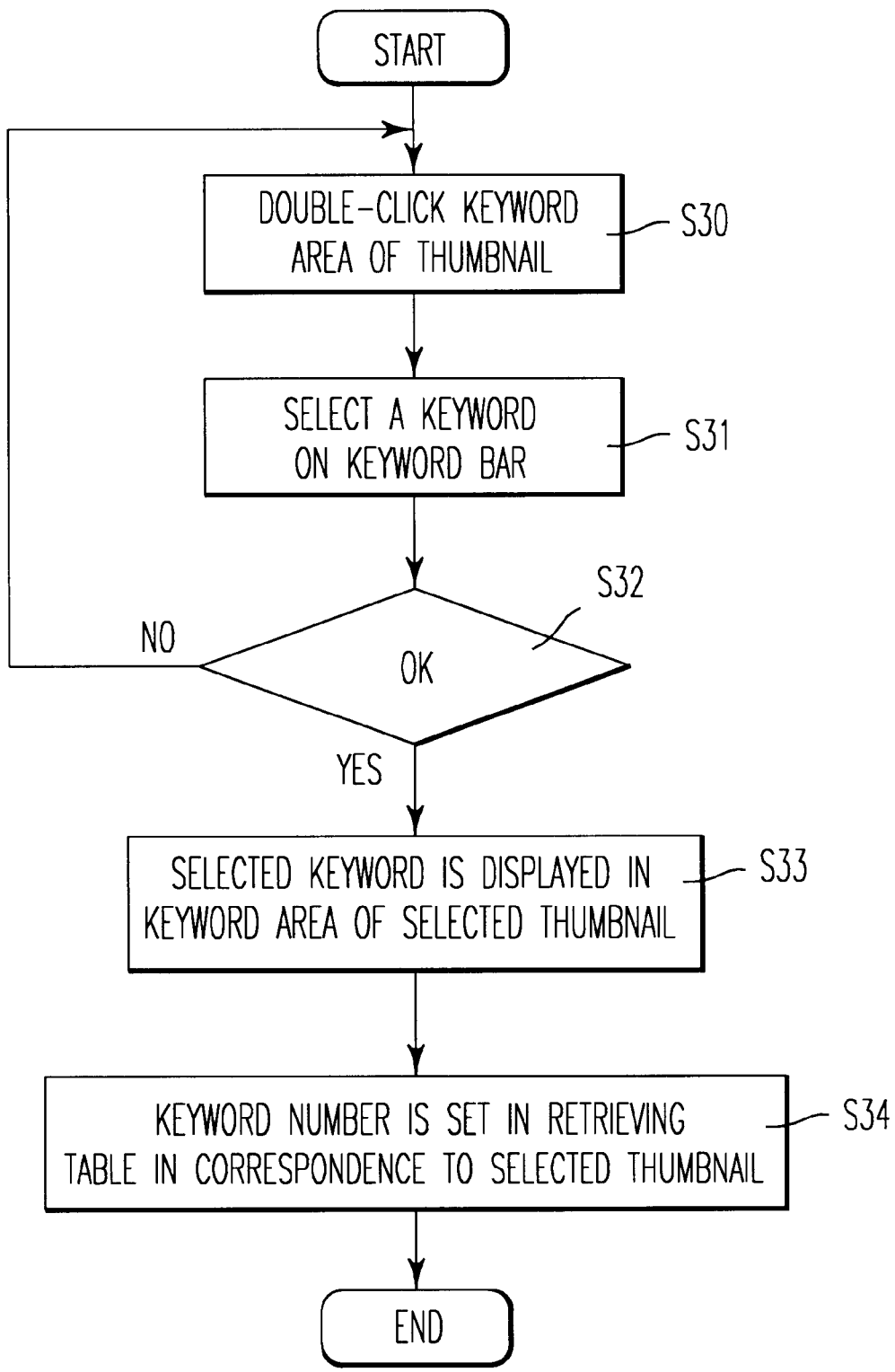
FIG. 20 is a flowchart explaining keyword registration processing steps executed for each individual thumbnail under control of a CPU.

Referring next to the flowchart of FIG. 20, an alternate keyword registration process executed for each thumbnail under control of the CPU 13, is described.

The process begins when the operator double-clicks the keyword area of a thumbnail for keyword setting in the browser screen (step S30). After that, when the operator selects a keyword on the keyword bar 600 (step S31) and clicks the "OK" button for confirmation (step S32), the selected keyword is displayed in the keyword area of the selected thumbnail (step S33) and the keyword character is set in the retrieving table 17c in correspondence to the selected thumbnail (step S34). The keyword for the thumbnail is not limited to one—plural keywords can be set therefor. For example, the retrieving table 17b shown in FIG. 4 sets the keyword character "A" (picture of sea) in the "dibE333.bmp" file, the keyword characters "A" (picture of sea) and "B" (picture of mountain) in the "0035.bmp" file, and the keyword character "C" (overseas travel) in the "0238.JPG" file, respectively. Such keywords may be set for the thumbnails while displaying a keyword setting dialog box shown in FIG. 21.

5.7 Release of keyword from thumbnail

Figure 21:
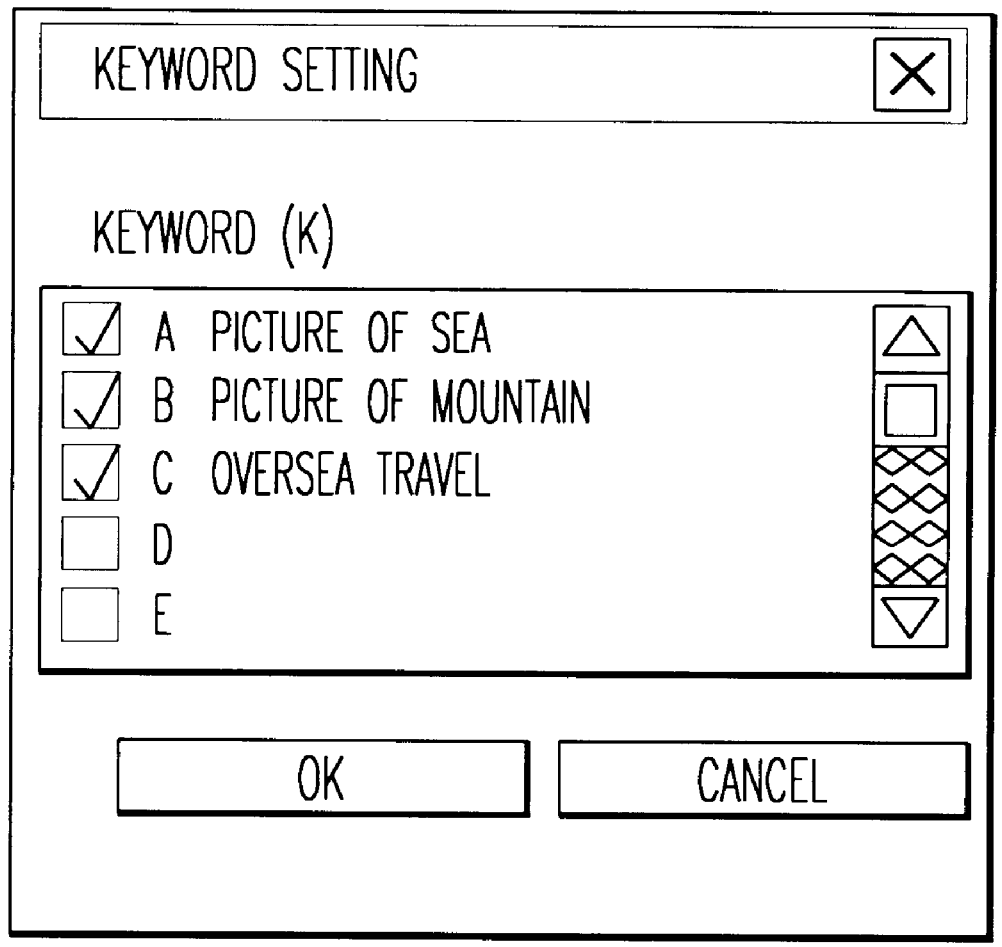
FIG. 21 is a keyword setting dialog box according to the present invention.

Next, a keyword release process, executed for respective thumbnails under control of the CPU 13, is described. When the operator double-clicks the keyword display area of a desired thumbnail for releasing the keyword, a keyword setting dialog box such as one shown in FIG. 21 is displayed. Then, the operator selects in the keyword setting dialog box a keyword to be released so as to delete a corresponding keyword character from the retrieving table 17c. As a result, the keyword previously set for the thumbnail is deleted.

5.8 Retrieval

Figure 22:
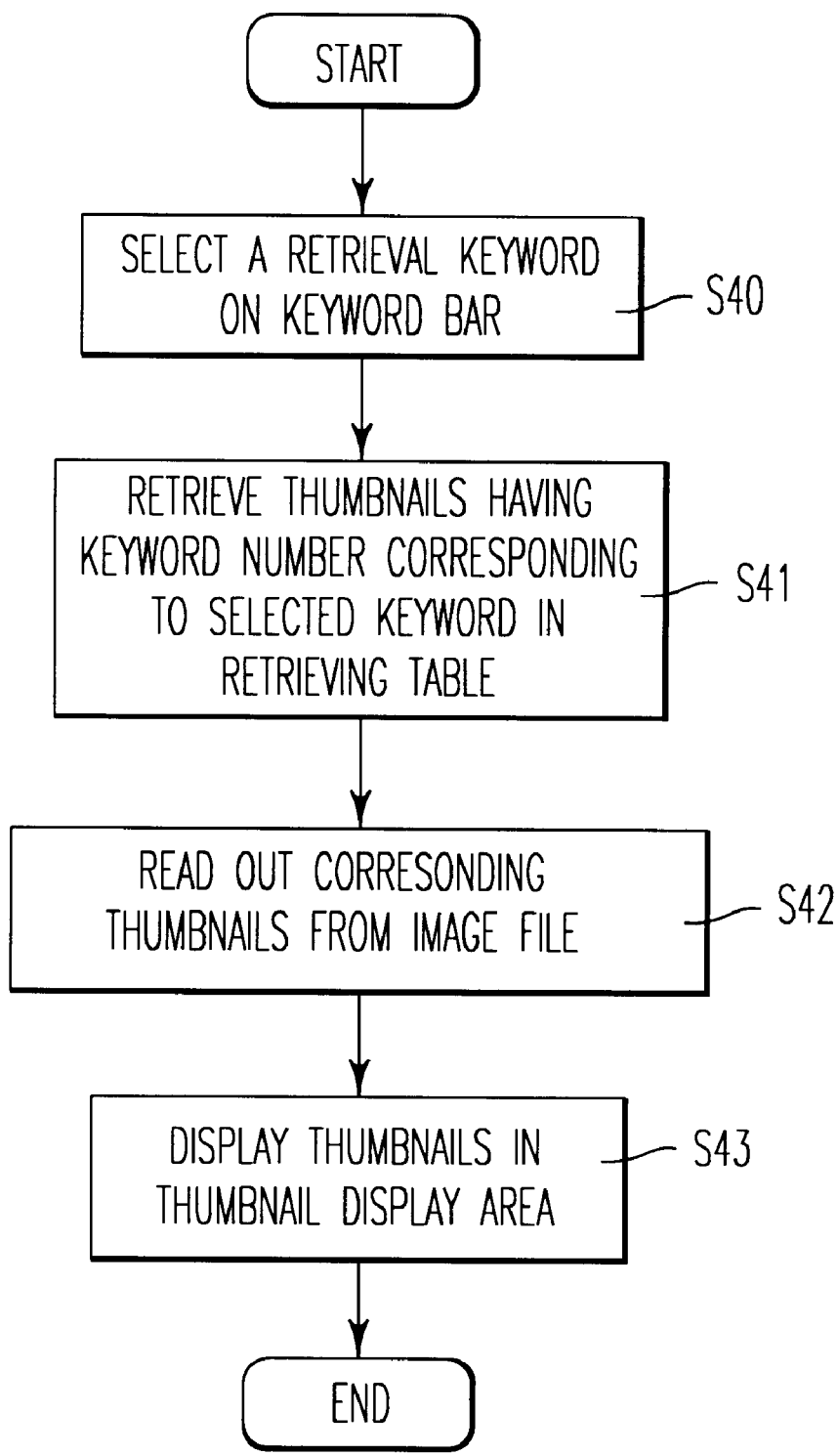
FIG. 22 is a flowchart explaining retrieval processing steps executed under control of the CPU.
Figure 23:
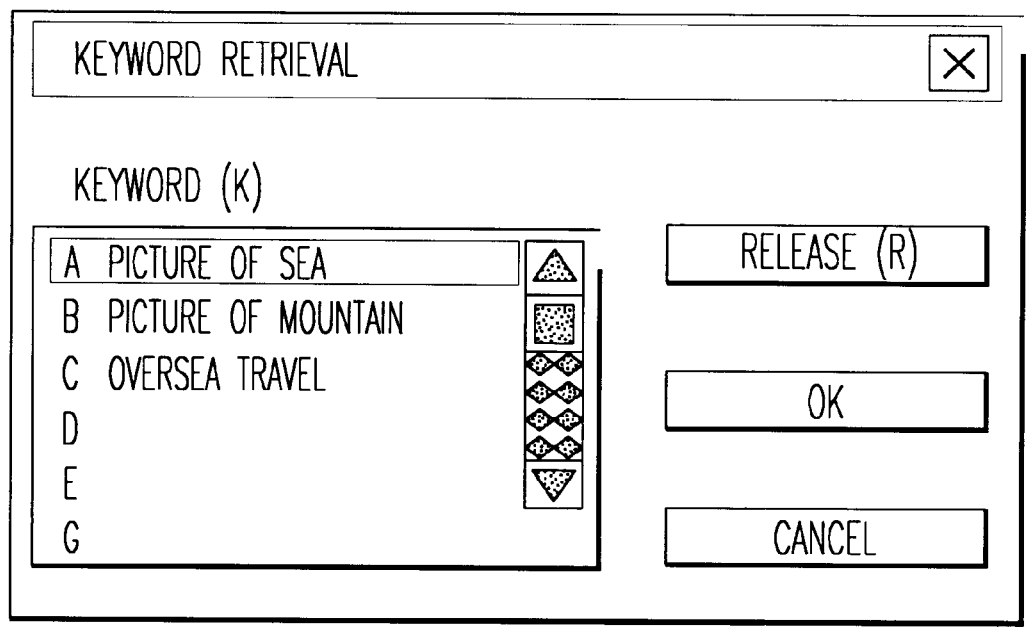
FIG. 23 is a keyword retrieval dialog box according to the present invention.

Referring next to a flowchart of FIG. 22, a retrieval process executed under control of the CPU 13 is described. When the operator selects a retrieval keyword on the keyword bar 600 in the browser screen (step S40), a thumbnail or thumbnails having a keyword character corresponding to the selected keyword are retrieved by referring to the retrieving table 17b (step S41, see FIG. 4 for the retrieving table 17b). Thus, the corresponding thumbnails are read out from the image file 17c (step S42, see FIG. 3 for the image file 17c) and displayed in the thumbnail display area (step S43). In other words, only the thumbnails with the selected keyword set therefor are displayed. Such a keyword can be set in plural characters, and in this case, only the thumbnails with all the selected keywords set therefor are displayed. The keyword or keywords to be retrieved may be selected while displaying a keyword retrieval dialog box such as one shown in FIG. 23, instead of keyword selection by referring to the retrieving table 17b.

Although the above process was described for the case where a word is registered as a keyword, a sentence, or partial sentence, may be registered as the keyword. Further, a word may be registered as a keyword with adding captions to each thumbnail so that thumbnails with such captions including the word as this keyword can be retrieved. Specifically, if a word "location" is registered as a keyword, thumbnails with captions including the word "location" may be retrieved.

Furthermore, Boolean logic may be applied to the keywords when retrieving data files.

5.9 Image editing

Next, an image editing process executed under control of the CPU 13 is described.

(1) Change of sorting order

The process begins when the operator selects "SORTING" from the pull-down "DISPLAY" menu on the menu bar 100 in the browser screen (see FIG. 13(c)) and selects a sorting rule among "name order", "type order" and "date order". Further, the operator selects "SORTING" from the pull-down "DISPLAY" menu on the menu bar 100 and selects either "ascending order" or "descending order". Thus image files (thumbnails) are sorted and displayed in either ascending or descending order according to the name (file name), the type (extension) or the date (creation date).

(2) Change of thumbnail display size

When the operator selects "DISPLAY SIZE" from the pull-down "DISPLAY" menu on the menu bar 100 in the browser screen (see FIG. 13(c)) and selects either "large" or "small", the thumbnail is displayed by changing the size to the selected size.

(3) Memo Setting

When the operator double-clicks on the browser screen, a memo setting existence display button (see FIG. 11) of a thumbnail (image file) for which a memo is to be set, in a memo setting dialog box, not shown, is displayed. After that, when the operator enters a memo in the memo setting dialog box, the existence of memo information setting is set to "1" for the corresponding image file in the retrieving table 17b, and the memo information is set (stored) in the image file.

(4) Sound setting

When the operator double-clicks on the browser screen, a sound setting existence display (see FIG. 11) of a thumbnail (image file) for which sound data is to be set, in a sound setting dialog box, not shown, is displayed. After that, when the operator enters a sound file name (e.g., WAV file) in the sound setting dialog box, the sound file input to the corresponding image file is set in the retrieving table 17b.

(5) Sound playback

When the operator double-clicks on the browser screen, the sound setting existence display (see FIG. 11) of an image file with which sound is to be played, a sound setting dialog box, not shown, is displayed. After that, when the operator selects PLAYBACK in the sound setting dialog box, the sound is played from a loudspeaker, not shown.

(6) Conversion of file format

The operator selects an image file of the file format to a which the file is to be converted. After that, when the operator selects "CONVERT IMAGE FORMAT" from the pull-down "IMAGE" menu on the menu bar 100 and then selects "STORAGE FORMAT", the image file is converted in the selected storage format. The "STORAGE FORMAT" includes J6I, TIFF (TAG Image File Format), EXIT (Exchangeable Image File) JPG (Joint Photographic Expert Group), BMP (Bitmap), GIF (Graphics Interchange format) and the like.

5.10 Image correction

Next, an image correction process executed under control of the CPU 13 is described.

(1) Correction of brightness/contrast

Figure 24:
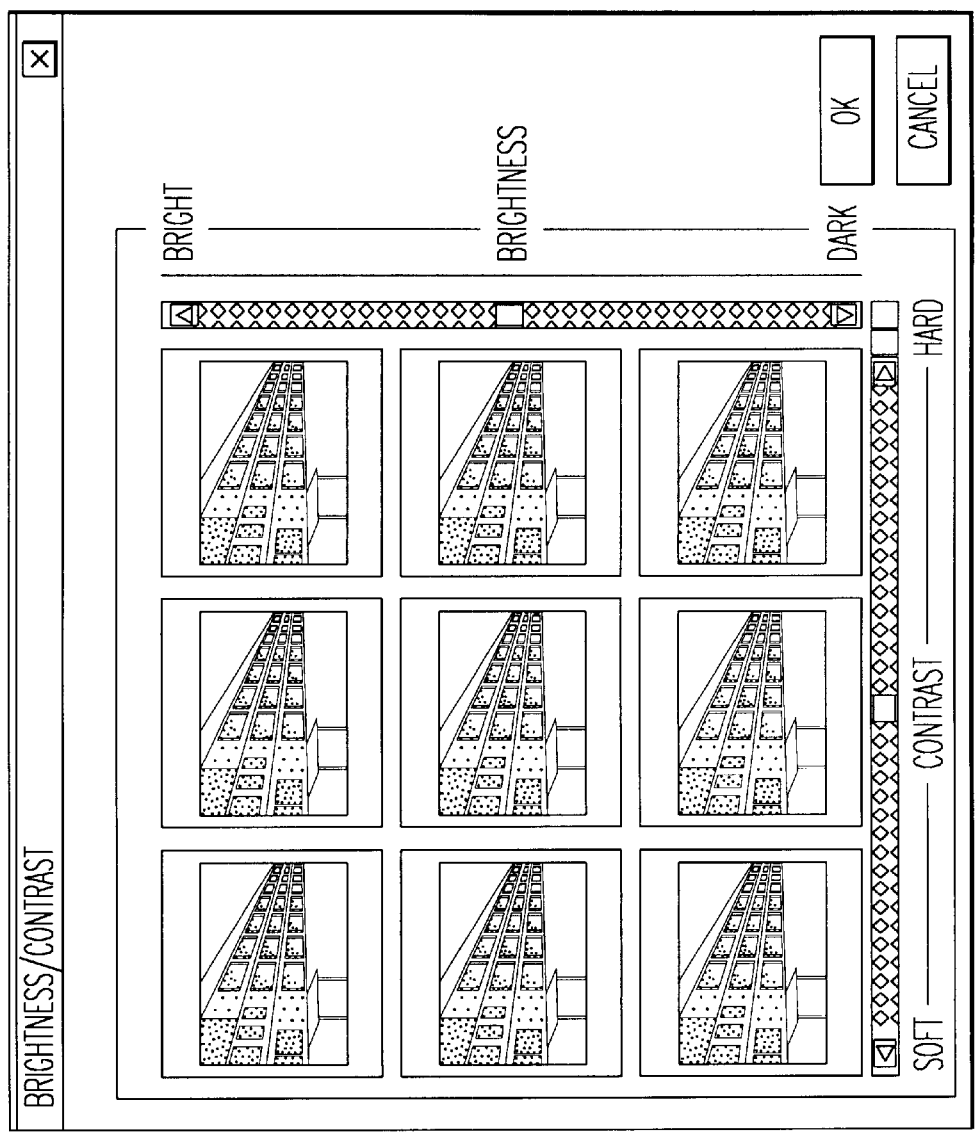
FIG. 24 is an example of display for correcting and controlling brightness and contrast.

Initially, on the browser screen, the operator double-clicks on a thumbnail displayed in the thumbnail display area 500. Specifically, if the "0035.bmp" file is clicked in FIG. 9, a viewer screen such as one shown in FIG. 12 is displayed. The image of the "0035.bmp" file is displayed on the viewer screen. After that, when the operator selects "BRIGHTNESS/CONTRAST" from the pull-down "CORRECTION" menu on the menu bar in the viewer screen (see FIG. 14(B)), plural thumbnails increasingly different in brightness and contrast from one another are displayed around the original picture in a manner shown in FIG. 24 so that the operator can select an optimum image from these images.

(2) Correction of sharpness

When the operator double-clicks a thumbnail displayed in the thumbnail display area 500, an image corresponding to the thumbnail is displayed on the viewer screen. After that when the operator selects "SHARPNESS" from the pull-down "CORRECTION" menu on the menu bar in the viewer screen (see FIG. 14(B)), a sharpness setting dialog box, not shown, is displayed. Then the operator selects a degree of sharpness with a slider button in the sharpness setting dialog box so as to correct the image to have the selected sharpness. The sharpness-corrected image is displayed on the viewer screen.

(3) Image rotation

Initially, on the browser screen, the operator double-clicks on a thumbnail displayed in the thumbnail display area 500. The image corresponding to the selected thumbnail is then displayed on the viewer screen. After that, when the operator selects "ROTATION" from the pull-down "CORRECTION" menu on the menu bar in the viewer screen (see FIG. 14(B)) and then selects either "rotate 90 degree to the right" or "rotate 90 degree to the left", the image on the viewer screen is rotated 90 degree in the clockwise or counterclockwise direction.

If the image has been photographed with a digital camera, or digital video camera, the image to be displayed may be rotated on the viewer screen at a predetermined angle based on the photographing information including an angle of the photographed image. This allows the image to be displayed at an angle at which the image was photographed by the photographer.

(4) Recovery of original picture from corrected image

While on the browser screen, the operator double-clicks on a thumbnail displayed in the thumbnail display area 500, the image corresponding to the selected thumbnail is then displayed on the viewer screen. After that, when the operator selects "RECOVER ORIGINAL PICTURE" from the pull-down "CORRECTION" menu on the menu bar in the viewer screen (see FIG. 14(B)), the corrected image is returned to the original picture and displayed on the viewer screen.

While the above described embodiment may be implemented in a desktop computer setting, other processor-based machines may also accommodate the present invention. For example, the present invention may be conveniently implemented in a laptop computer, a digital camera (such as a Ricoh DC1 or DC2 appropriately adapted to support the memory and data input features of the present invention), and a digital video (DV) recorder. In either case, the system shown in FIG. 1 is contained within a computer, camera or DV casing. In the DV application, either thumbnails or video clips may be presented to the user for identification of the subject matter contained in the file.

As described above, according to the present invention, there is provided a display processing apparatus having a plurality of display areas in a display screen that enables a user to browse various files such as image files, audio files and document files. The display processing device includes a folder identification display mechanism for identifying and displaying a folder selected in a folder display area, and a file information display mechanism for displaying, in a related information display area, related information for files included in the selected folder. It is therefore possible to provide a display processing apparatus that allows easy understanding of the contents of the files.

According to the invention, when at least one image file is contained in the selected folder, since the file information display mechanism displays a thumbnail corresponding to the image file in the related information display area, the contents of the image file can easily be understood.

According to the invention, when at least one document or audio file is contained in the selected folder, since an icon indicative of the type of the document or audio file is displayed in the related information display area, the contents of the document or audio file can easily be understood.

According to the invention, the display processing device further includes a thumbnail creation mechanism for creating a thumbnail of a selected image file and storing the created thumbnail in a storage mechanism in association with the selected image file, and a thumbnail display mechanism that reads out and displays the thumbnail in the related information display area when the thumbnail has already been stored in the storage mechanism at the time of displaying the thumbnail or creates and displays a new thumbnail in the related information display area when the thumbnail has not been stored in the storage mechanism. It is therefore possible to display the thumbnail at high speed after the second execution.

According to the invention, the display processing apparatus further includes a keyword input mechanism for inputting one or plural keywords, a keyword setting mechanism for setting the one or plural keywords for corresponding one or plural thumbnails respectively, a keyword selection mechanism for selecting one or plural ones of the keywords input by the keyword input mechanism, and a retrieval mechanism for retrieving thumbnails with the selected keywords set therefor using the keywords, selected by the keyword selection mechanism, as a retrieval key, such that the selected thumbnails are displayed in a list. It is therefore possible to retrieve an image file (thumbnail) efficiently based on the keywords.

According to the invention, the display processing apparatus further includes a keyword input mechanism for inputting one or plural keywords, a keyword display mechanism for displaying, the keywords, input by the keyword input mechanism, in a keyword display area, a keyword setting mechanism for setting the one or plural keywords for corresponding one or plural thumbnails respectively, a keyword selection mechanism for selecting one or plural ones of the keywords displayed in the keyword display area, and a retrieval mechanism for retrieving across plural folders thumbnails with the selected keywords set therefore, using the keywords, selected by the keyword selection mechanism as a retrieval key, such that the selected thumbnails are displayed in a list. It is therefore possible to retrieve an image file (thumbnail) efficiently in a wide range across plural folders.

According to the invention, since the display processing apparatus further includes an image rotation mechanism for displaying an image corresponding to each thumbnail after rotated at a specific angle, the image can be displayed at an angle easy to see for the operator.

According to the invention, since the image rotation mechanism displays the image after rotated at a predetermined angle based on photographing information for the image, the image can be displayed at an angle at which the image was photographed by the photographer.

According to the invention, the display processing apparatus further includes an application start mechanism for starting another different application after transferring an image file corresponding to a thumbnail to the different application by dragging and dropping a the thumbnail to an icon indicative of the different application displayed in an icon display area. It is therefore possible to transfer the file to another different application easily in a drag-and-drop operation for starting the different application.

According to the invention, the display processing apparatus further includes a correction mechanism for correcting brightness and contrast of a thumbnail in steps and displaying the resulting plural thumbnails in a list. Since the plural thumbnails the brightness and contrast of which are corrected in steps can be displayed in a list, the operator can easily correct the brightness and contrast of the thumbnail.

According to the invention, there is provided a recording medium with a program recorded therein for enabling a computer to function as the display processing apparatus according to the invention as described above. Since the recorded program is provided for implementing the computer to function as respective mechanisms of the display processing apparatus according to the above description, the display processing apparatus allows for easy understanding of the contents of respective files by executing the program recorded therein.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may be implemented by the preparation of application specific integrated circuits or by interconnecting an appropriate network of conventional component circuits, as will be readily apparent to those skilled in the art.

Features of the present invention are further described in "Digiclip-P Operation Manual", Jun. 24, 1997, Ricoh part number L611-1603 and "Digiclip Operation Manual", Jun. 24, 1997, Ricoh part number L611-1602, the entire contents of both of which are incorporated herein by reference.

Obviously, numerous additional modifications and variations of the present invention are possible in light of the above teaching. It is therefore to be understood that within the scope of the appended claims, the present invention may be practiced otherwise than a specifically described.

This application is based upon the Japanese patent application No. 09-198739 filed in Japanese Patent Office on Jul. 24, 1997, the entire contents thereof being incorporated herein by reference.

What is claimed is:

1. An apparatus comprising:
   a processor;
   a data path;
   a display device coupled to said processor;
   an interface unit configured to receive an instruction from an external source and provide a corresponding instruction signal to said processor; and
   a computer readable medium coupled to said processor via said data path and encoded with processor executable computer readable instructions, said processor executable computer readable instructions, when executed, implementing
      a file directory display mechanism configured to display on a display portion of said display a data file indication of a non-directory data file stored in said computer readable medium,
      a graphics display mechanism configured to display in a display portion of said data file indication, within a geometric perimeter of said data file indication, at least one graphics image related to data in said data file, and
      an additional information display mechanism configured to display, within the geometric perimeter of said data file indication, at least one user-modifiable symbol linked to at least one user-modifiable and searchable data structure including at least one of words, a phrase, and a sentence.

2. The apparatus of claim 1, wherein said file directory display mechanism is configured to display a directory tree of said data file relative to other data files.

3. The apparatus of claim 1, wherein the external source includes at least one of a keyboard, a mouse, a voice recognition mechanism, a touchscreen and a track ball.

4. The apparatus of claim 1, wherein:
   said computer readable medium is encoded with additional computer readable instructions that, when executed by the processors, implement
      a keyword search mechanism that, in response to a keyword query, is configured to identify and display the data file in the display portion, if said data file has associated therewith a keyword corresponding with the query.

5. The apparatus of claim 4, further comprising:
   a keyword association mechanism, wherein more than one keyword is associated with the data file.

6. The apparatus of claim 4, further comprising:
   a sound file association mechanism, configured to associate a sound file with said data file, and said indicator of said information display mechanism being configured to provide a sound file indicator if a sound file is present.

7. The apparatus of claim 4, further comprising:
   a memo association mechanism, configured to associate a memo file with said data file, said additional information display mechanism configured to display a memo indicator indicative of a presence of a memo file corresponding to said data file.

8. The apparatus of claim 4, further comprising:
   a keyword association mechanism configured to associate the keyword to said data file and display a keyword indicator through said additional information display mechanism indicative of a presence of the keyword associated with said data file.

9. The apparatus of claim 1, further comprising:

a drag and drop mechanism configured to respond to an external move signal from said interface by moving said graphics image to an application icon, so as to launch an application associated with said application icon and read said data file into said application.

10. The apparatus of claim 1, further comprising:

a camera configured to receive a photographic image and record said photographic image in said computer readable medium as said data file.

11. The apparatus of claim 1, further comprising:

a separate camera configured to generate said data file, said separate camera having another computer readable medium in which said separate camera stores said data file, wherein said another computer readable medium is configured to connect to said interface unit and download said data file to said computer readable medium.

12. The apparatus of claim 11, wherein:

said another computer readable medium comprises at least one of a semiconductor memory, a magnetic memory, an optical memory, and a ferromagnetic memory.

13. The apparatus of claim 11, wherein:

said another computer readable medium comprises at least one of a floppy disc, an optical disc, and a memory card.

14. The apparatus of claim 10, further comprising:

a digital still camera casing that houses said camera recording mechanism, said processor, said data path, said computer readable medium, said display device, and said interface unit.

15. The apparatus of claim 10, further comprising:

a digital video camera casing, that houses said camera recording mechanism, said processor, said data path, said computer readable medium, said display device, and said interface unit.

16. The apparatus of claim 10, wherein said camera comprises a camera housing that is separate from another housing that contains at least said computer readable medium.

17. The apparatus of claim 1, wherein:

said indicator includes a single memo indicator, a single sound file indicator, and a single keyword indicator.

18. The apparatus of Clam 1, wherein:

said indicator includes a single memo indicator, a single audio indicator, and plural keyword indicators.

19. The apparatus of claim 1, wherein said indicator includes plural memo indicators, plural audio indicators, and plural keyword indicators.

20. The apparatus of claim 1, wherein:

said graphics image comprises a thumbnail image.

21. The apparatus of claim 1, further comprising:

a rotation mechanism configured to rotate the graphics image based on a rotation command input from the external source.

22. The apparatus of claim 1, further comprising:

a brightness and contrast correction mechanism configured to correct at least one of a brightness and a contrast of the graphics image.

23. A computer program product comprising:

a computer readable medium encoded with computer readable instructions that on computer execution implement a file directory display mechanism configured to display on a display portion of a display a data file indication of a non-directory data file stored in said computer readable medium, a graphics display mechanism configured to display on a display portion of said data file indication within a geometric perimeter of said data file indication at least one graphics image related to data in said data file, and an additional information display mechanism configured to display, within the geometric perimeter of said data file indication, at least one user-modifiable symbol linked to at least one user-modifiable and searchable data structure including at least one of words, a phrase, and a sentence.

24. The computer program product of claim 23, wherein:

said computer readable medium is encoded with additional computer readable instructions that when executed by the processor implement a thumbnail generation mechanism that generates a thumbnail image as said graphics image.

25. A method for presenting a non-directory data file in graphics form on a display, comprising the steps of:

storing the data file in a computer readable medium;

receiving an instruction from an external source;

providing to a processor an instruction signal corresponding to the instruction, said instruction corresponding with an identification of said data file stored in said computer readable medium;

displaying on a display portion of said display a data file indication of the data file stored in a computer readable medium;

displaying on a display portion of said indication within a geometric perimeter of said data file indication at least one graphics image representative of said data in said data file; and displaying, within the geometric perimeter of said data file indication, at least one user-modifiable symbol linked to at least one user-modifiable and searchable data structure including at least one of words, a phrase, and a sentence.

26. The method of claim 25, wherein:

said step of displaying on a first display portion comprises displaying a directory tree of said data file relative to other data files.

27. The method of claim 25, wherein:

said receiving step comprises receiving said instruction from at least one of a keyboard, a mouse, a voice recognition mechanism, a touchscreen and a track ball.

28. The method of claim 25, further comprising steps of:

associating a keyword with said data file;

receiving a search instruction from said external source; and searching for the data file by identifying candidate data files that have the keyword associated therewith, and displaying said candidate data files.

29. The method of claim 28, further comprising a step of:

associating at least one of a sound file and a memo file with said data file.

30. The method of claim 25, further comprising the steps of:

receiving a move instruction from the external source; and moving said graphics image to an application icon; and launching an application associated with said application icon and reading said data file into said application.

31. The method of claim 25, wherein respective of the displaying steps include providing a display image on at least one of a digital camera display and a digital video recorder display.

32. The method of claim 25, wherein:

said step of displaying on an indication displays a thumbnail image as said graphics image.

33. An apparatus for presenting a data file in graphics form on a display, comprising:

means for storing the data file in a computer readable medium;

means for receiving an instruction from an external source and providing a corresponding instruction signal to a processor, said instruction corresponding with an identification of said data file stored in said computer readable medium;

means for displaying on a display portion of said display a data file indication of the data file stored in a computer readable medium;

means for displaying on a display portion of said indication within a geometric perimeter of said indication a graphics image representative of said data in said data file; and means for displaying, within the geometric perimeter of said data file indication, at least one user-modifiable symbol linked to at least one user-modifiable and searchable data structure including at least one of words, a phrase, and a sentence.

34. The apparatus of claim 33, wherein:

said means for displaying on a display portion comprises means for displaying a directory tree of said data file relative to other data files.

35. The apparatus of claim 33, wherein:

said means for receiving comprises means for receiving said instruction from at least one of a keyboard, a mouse, a voice recognition mechanism, a touchscreen and a track ball.

36. The apparatus of claim 33, further comprising:

means for associating a keyword with said data file;

means for receiving a search instruction from said external source;

means for searching for the data file by identifying candidate data files that have the keyword associated therewith, and displaying said candidate data files.

37. The apparatus of claim 36, further comprising:

means for associating at least one of a sound file and a memo file with said data file.

38. The apparatus of claim 33, further comprising:

means for receiving a move instruction from the external source;

means for moving said graphics image to an application icon; and means for launching an application associated with said application icon and reading said data file into said application.

39. The apparatus of claim 33, wherein:

respective of the means for displaying includes means for providing a display image on at least one of a digital camera display and a digital video recorder display.

40. The apparatus of claim 33, wherein:

said means for displaying on an indication includes means for displaying a thumbnail image as said graphics image.

41. The apparatus of claim 33, further comprising;

means for rotating the graphics image based on a rotation command input from the external source.

42. The apparatus of claim 33, further comprising:

means for correcting a brightness and contrast of the graphics image.

43. The apparatus of claim 1, wherein said data path comprises at least one of an ISDN, a LAN, a WAN, and a telephone line using an internal modem.

44. The apparatus of claim 43, wherein said data path utilizes Windows NT compatible protocols.

45. The apparatus of claim 1, wherein said computer readable instructions are part of a browser software application.

46. The apparatus of claim 1, wherein said external source is at least one of a remote terminal and a wireless device.

47. The apparatus of claim 1, wherein said interface unit is configured to receive said instruction from a digital camera over at least one of an ISDN, a LAN, a WAN, and a telephone line using an internal modem.

48. The apparatus of claim 47, wherein at least a portion of said ISDN, LAN, WAN, and telephone line is the Internet.

49. The apparatus of claim 43, wherein at least a portion of said ISDN, LAN, WAN, and telephone line is the Internet.

50. The computer program product of claim 23, wherein said file directory display mechanism comprises at least one of an ISDN, a LAN, a WAN, and a telephone line using an internal modem.

51. The computer program product of claim 50, wherein said file directory display mechanism utilizes Windows NT compatible protocols.

52. The computer program product of claim 23, wherein said computer readable instructions are part of a browser software application.

53. The computer program product of claim 50, wherein at least a portion of said ISDN, LAN, WAN, and telephone line is the Internet.

54. The method of claim 25, wherein said step of storing the data file utilizes at least one of an ISDN, a LAN, a WAN, and a telephone line using an internal modem.

55. The method of claim 25, wherein said step of storing the data file utilizes Windows NT compatible protocols.

56. The method of claim 25, wherein said steps of are part of a browser software application.

57. The method of claim 25, wherein said external source is at least one of a remote terminal and a wireless device.

58. The method of claim 25, wherein said instruction is received from a digital camera over at least one of an ISDN, a LAN, a WAN, and a telephone line using an internal modem.

59. The method of claim 58, wherein at least a portion of said ISDN, LAN, WAN, and telephone line is the Internet.

60. The method of claim 54, wherein at least a portion of said ISDN, LAN, WAN, and telephone line is the Internet.

* * * * *